US010627916B2

United States Patent
Tokuchi

(10) Patent No.: US 10,627,916 B2
(45) Date of Patent: Apr. 21, 2020

(54) INFORMATION PROCESSING DEVICE WITH FLEXIBLE DISPLAY, INFORMATION PROCESSING METHOD, AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/015,197

(22) Filed: Jun. 22, 2018

(65) Prior Publication Data

US 2019/0121447 A1    Apr. 25, 2019

(30) Foreign Application Priority Data

Oct. 23, 2017   (JP) .................. 2017-204802

(51) Int. Cl.
*G06F 3/03*   (2006.01)
*G06F 1/16*   (2006.01)
*G06F 3/01*   (2006.01)

(52) U.S. Cl.
CPC .............. *G06F 3/03* (2013.01); *G06F 1/1626* (2013.01); *G06F 1/1652* (2013.01); *G06F 1/1694* (2013.01); *G06F 3/017* (2013.01)

(58) Field of Classification Search
CPC ....................................................... G06F 3/03
See application file for complete search history.

(56) References Cited

U.S. PATENT DOCUMENTS

| 8,174,628 | B2 | 5/2012 | Matsushita et al. | |
| 2011/0227822 | A1* | 9/2011 | Shai | G06F 1/1615 345/156 |
| 2012/0140284 | A1 | 6/2012 | Tashiro et al. | |
| 2014/0063542 | A1 | 3/2014 | Aoki | |
| 2014/0157156 | A1* | 6/2014 | Kawamoto | G05D 1/0038 715/764 |

FOREIGN PATENT DOCUMENTS

| JP | 2012-096448 | 5/2012 |
| JP | 5351114 | 11/2013 |
| JP | 2014-048672 | 3/2014 |

* cited by examiner

*Primary Examiner* — Gustavo Polo
(74) *Attorney, Agent, or Firm* — JCIPRNET

(57) ABSTRACT

An information processing device includes a controller that controls an instruction to a control target associated with an image displayed at a changed position, according to a detection result of a change in each position on a deformable display. In a further modification of the invention, the controller may further change the image displayed at the changed position, according to the detection result.

19 Claims, 24 Drawing Sheets

FIG.6

<DEVICE FUNCTION MANAGEMENT TABLE>

| DEVICE ID | DEVICE NAME (TYPE) | FUNCTION | DEFORMATION OPERATION | EXECUTION SOLO FUNCTION | IMAGE ID |
|---|---|---|---|---|---|
| A | PC | DISPLAY FUNCTION, SAVING FUNCTION ··· | ··· ··· ··· | ··· ··· ··· | ··· |
| B | MULTIFUNCTION DEVICE | PRINT FUNCTION, SCAN FUNCTION, COPY FUNCTION, FACSIMILE FUNCTION, POST-PROCESSING FUNCTION ··· | ··· ··· ··· ··· | ··· ··· ··· ··· | ··· |
| C | PROJECTOR | PROJECTION FUNCTION ··· | ··· ··· ··· | ··· ··· ··· | ··· |
| D | ROBOT | ··· | ··· ··· ··· | ··· ··· ··· | ··· |
| ··· | ··· | ··· | ··· | ··· | ··· |

FIG.7

<LINKAGE FUNCTION MANAGEMENT TABLE>

| DEVICE ID COMBINATION | DEVICE NAME (TYPE) | LINKAGE FUNCTION | DEFORMATION OPERARTION | EXECUTION LINKAGE FUNCTION |
|---|---|---|---|---|
| A, B | PC (A), MULTIFUNCTION DEVICE (B) | SCAN TRANSFER FUNCTION, PRINT FUNCTION … | ⋮ | ⋮ |
| A, C | PC (A), PROJECTOR (C) | PROJECTION FUNCTION, PRINT FUNCTION … | ⋮ | ⋮ |
| B, C | MULTIFUNCTION DEVICE(B), PROJECTOR (C) | PROJECTION FUNCTION, PRINT FUNCTION … | ⋮ | ⋮ |
| ⋮ | ⋮ | ⋮ | ⋮ | ⋮ |

FIG. 18

<LINKAGE FUNCTION MANAGEMENT TABLE>

| DEVICE ID COMBINATION | DEVICE NAME (TYPE) | EXECUTION LINKAGE FUNCTION | ARRANGEMENT ORDER | PRIORITY |
|---|---|---|---|---|
| A, B | PC (A), MULTIFUNCTION DEVICE (B) | SCAN TRANSFER FUNCTION | B→A | 1 |
| | | | A→B | 2 |
| | | PRINT FUNCTION | A→B | 1 |
| | | | B→A | 2 |
| A, C | PC (A), PROJECTOR (C) | PROJECTION FUNCTION | A→C | 1 |
| | | | C→A | 2 |
| | | ... | C→A | 1 |
| | | | A→C | 2 |
| ... | ... | ... | ... | ... |

<DEVICE FUNCTION MANAGEMENT TABLE>

| DEVICE ID | DEVICE NAME (TYPE) | POSITION IN IMAGE | SOLO FUNCTION | IMAGE ID |
|---|---|---|---|---|
| A | PC | ... | SCREEN DISPLAY FUNCTION | ... |
| | | ... | DATA STORAGE FUNCTION | |
| | | ... | ... | |
| B | MULTIFUNC- TION DEVICE | ... | PRINT FUNCTION | ... |
| | | ... | SCAN FUNCTION | |
| | | ... | STAPLING FUNCTION | |
| | | ... | ... | |
| ... | ... | ... | ... | ... |

FIG.22

<DEVICE FUNCTION MANAGEMENT TABLE>

| DEVICE ID | DEVICE NAME (TYPE) | PORTION | PORTION ID | SOLO FUNCTION | PORTION IMAGE ID |
|---|---|---|---|---|---|
| A | PC | DISPLAY UNIT | Aa | SCREEN DISPLAY FUNCTION | ... |
| | | MAIN BODY PORTION | Ab | DATA STORAGE FUNCTION | ... |
| | | ... | ... | ... | ... |
| B | MULTIFUNC-TION DEVICE | MAIN BODY PORTION | Ba | PRINT FUNCTION | ... |
| | | READING UNIT | Bb | SCAN FUNCTION | ... |
| | | POST-PRO-CESSING DEVICE | Bc | STAPLING FUNC-TION | ... |
| | | ... | ... | ... | ... |
| C | PROJECTOR | MAIN BODY PORTION | Ca | PROJECTION FUNC-TION | ... |
| | | ... | ... | ... | ... |
| ... | ... | ... | ... | ... | ... |

FIG.23

<LINKAGE FUNCTION MANAGEMENT TABLE>

| COMBINATION OF POR-TIONS OF DEVICES | PORTION ID COMBINATION | EXECUTION LINKAGE FUNCTION |
|---|---|---|
| DISPLAY UNIT OF PC (A), MAIN BODY PORTION OF MULTIFUNCTION DEVICE (B) | Aa, Ba | PRINT FUNCTION |
| | ... | ... |
| MAIN BODY PORTION OF MULTIFUNCTION DEVICE (B), MAIN BODY PORTION OF PROJECTOR (C) | Ba, Ca | PRINT FUNCTION |
| | ... | ... |
| READING UNIT OF MULTI-FUNCTION DEVICE (B), MAIN BODY PORTION OF PROJECTOR (C) | Bb, Ca | SCAN PROJECTION FUNCTION |
| | ... | ... |

FIG.24

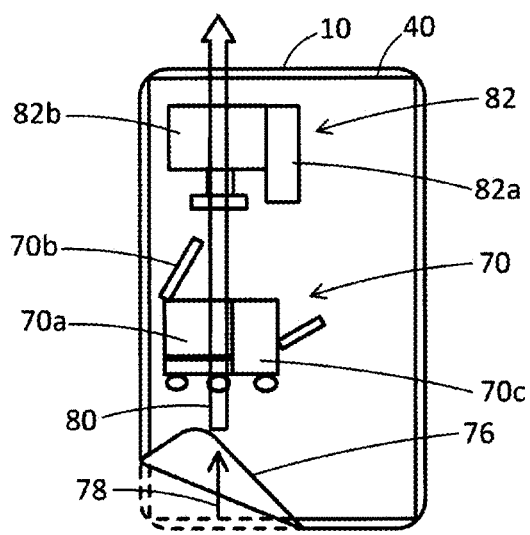

<LINKAGE FUNCTION MANAGEMENT TABLE>

| DEVICE ID COMBINATION | DEVICE NAME (TYPE) | LINKAGE FUNCTION | DEFORMATION OPERATION | EXECUTION LINKAGE FUNCTION |
|---|---|---|---|---|
| α, β | DATA TRANSMITTING (α), PASSWORD SETTING (β) | ... | ... | ... |
| | | | ... | ... |
| α, γ | DATA TRANSMITTING (α), VOICE OUTPUTTING (γ) | ... | ... | ... |
| | | | ... | ... |
| β, γ | PASSWORD SETTING (β), VOICE OUTPUTTING (γ) | ... | ... | ... |
| | | | ... | ... |
| ... | ... | ... | ... | ... |

<LINKAGE FUNCTION MANAGEMENT TABLE>

| ID COMBINA-TION | DEVICE NAME, FUNC-TION NAME (TYPE) | LINKAGE FUNCTION | DEFORMATION OPERATION | EXECUTION LINKAGE FUNCTION |
|---|---|---|---|---|
| A, α | PC (A), DATA TRANSMITTING (α) | ... | ... | ... |
| | | | ... | ... |
| A, β | PC (A), PASSWORD SETTING (β) | ... | ... | ... |
| | | | ... | ... |
| B, α | MULTIFUNCTION DEVICE (B), DATA TRANSMITTING (α) | ... | ... | ... |
| | | | ... | ... |
| ... | ... | ... | ... | ... |

FIG.33

<LINKAGE FUNCTION MANAGEMENT TABLE>

| FILE FORMAT COMBINATION | LINKAGE FUNCTION | DEFORMATION OPERATION | EXECUTION LINKAGE FUNCTION |
|---|---|---|---|
| DOCUMENT FORMAT, TABLE FORMAT | ·INSERT TABLE INTO DOCUMENT, ·INSERT DOCUMENT INTO TABLE | ... ... | ... ... |
| DOCUMENT FORMAT, IMAGE FORMAT | ·INSERT IMAGE INTO DOCUMENT, ·SUPERIMPOSE DOCUMENT ON IMAGE | ... ... | ... ... |
| DOCUMENT FORMAT, VIDEO FORMAT | ·INSERT VIDEO INTO DOCUMENT, ·INSERT STILL IMAGE INTO DOCUMENT | ... ... | ... ... |
| DOCUMENT FORMAT, DOCUMENT FORMAT | · INTEGRATE DOCUMENTS WITH EACH OTHER | ... ... | ... ... |
| TABLE FORMAT, TABLE FORMAT | · INTEGRATE TABLES WITH EACH OTHER | ... ... | ... ... |
| VIDEO FORMAT, VIDEO FORMAT | · INTEGRATE VIDEOS WITH EACH OTHER | ... ... | ... ... |
| SHEET FORMAT, DOCUMENT FORMAT | · INSERT DOCUMENT INTO PRESENTATION SHEET | ... ... | ... ... |
| ... | ... | ... | |

INFORMATION PROCESSING DEVICE WITH FLEXIBLE DISPLAY, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-204802 filed Oct. 23, 2017.

BACKGROUND

Technical Field

The present invention relates to an information processing device, an information processing method, and a non-transitory computer readable medium.

SUMMARY

According to an aspect of the invention, an information processing device includes a controller that controls an instruction to a control target associated with an image displayed at a changed position, according to a detection result of a change in each position on a deformable display.

BRIEF DESCRIPTION OF THE DRAWINGS

Exemplary embodiments of the present invention will be described in detail based on the following figures, wherein:

FIG. 6 is a diagram illustrating a device function management table;
FIG. 7 is a diagram illustrating a linkage function management table;
FIG. 18 is a diagram illustrating a linkage function management table according to Example 4;
FIG. 22 is a diagram illustrating a device function management table according to Example 6;
FIG. 23 is a diagram illustrating a linkage function management table according to Example 6;
FIG. 24 is a schematic diagram illustrating a terminal device;
FIG. 33 is a diagram illustrating a linkage function management table according to Example 12.

DETAILED DESCRIPTION

First Exemplary Embodiment

Figure 1:
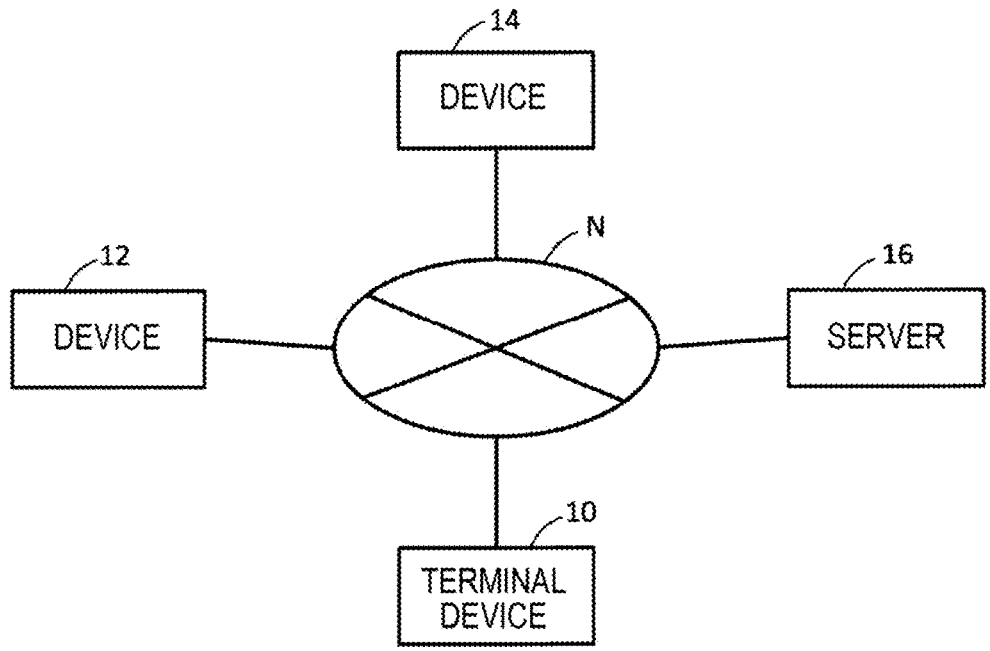
FIG. 1 is a block diagram illustrating a configuration of an information processing system according to a first exemplary embodiment of the present invention.

An information processing system according to a first exemplary embodiment of the present invention will be described with reference to FIG. 1. FIG. 1 illustrates an example of the information processing system according to the first exemplary embodiment.

The information processing system according to the first exemplary embodiment includes a terminal device 10, one or plural devices (e.g., devices 12 and 14), and a server 16 as an example of an external device. In the example illustrated in FIG. 1, the terminal device 10, the devices 12 and 14, and the server 16 have a function of communicating with each other via a communication path N such as a network. Of course, the terminal device 10, the devices 12 and 14, and the server 16 may communicate with other devices via different communication paths without using the communication path N. In the example illustrated in FIG. 1, two devices (devices 12 and 14) are included in the information processing system. However, one device may be included in the information processing system, or three or more devices may be included in the information processing system. Further, plural terminal devices 10 and plural servers 16 may be included in the information processing system. The server 16 may not be included in the information processing system.

The terminal device 10 is a device such as a personal computer (PC), a tablet PC, a smartphone, a mobile phone, or the like, and has a flexible display as a display device. Examples of the flexible display include an organic electroluminescence display (flexible organic EL display), an electronic paper display, a flexible liquid crystal display, and the like. Flexible displays employing display modes other than these may be used. The flexible display is a display having a flexibly deformable display portion, and is, for example, a display capable of being bent, folded, rolled, twisted, or stretched. The terminal device 10 may be a wearable terminal (e.g., a wrist watch type terminal, a wrist band type terminal, an eyeglass type terminal, a finger ring type terminal, a contact lens type terminal, an intracorporeal implantable terminal, a hearable terminal, or the like). In addition, the terminal device 10 has a function of transmitting and receiving data to and from other devices.

The devices 12 and 14 are devices having functions, and include, for example, an image forming device having an image forming function, a PC, a tablet PC, a smartphone, a mobile phone, a robot (a humanoid robot, an animal robot other than humanoid, etc.), a projector, a display device (a liquid crystal display, etc.), a recording device, a reproducing device, an image capturing device (a camera, etc.), a refrigerator, a rice cooker, a microwave oven, a coffee maker, a vacuum cleaner, a washing machine, an air conditioner, a lighting device, a clock, a surveillance camera, an automobile, a bicycle, an aircraft (e.g., an unmanned aerial vehicle (a so-called drone)), a game machine, and various types of sensing devices (e.g., a temperature sensor, a humidity sensor, a voltage sensor, a current sensor, etc.). The devices 12 and 14 may be devices that output the output to a user (e.g., an image forming device or a PC), or may be devices that do not output an output to a user (e.g., a sensing device). Further, all of the devices in the plural devices that execute linkage functions described below may be devices that output an output to a user. Alternatively, some devices may be devices that output an output to the user and other devices may be devices that do not output any output to the user. Alternatively, all of the devices may be devices that do not output any output to the user. The concept of the devices 12 and 14 may include all kinds of devices. For example, an information device, a video device, an audio device, and other devices may also be included in the category of the devices according to the first exemplary embodiment. In addition, the devices 12 and 14 have a function of transmitting and receiving data to and from other devices.

The server 16 is a device that manages data, manages user information, and manages the devices 12 and 14. In addition, the server 16 has a function of transmitting and receiving data to and from other devices.

In the first exemplary embodiment, a change in each position on the flexible display is detected, and an instruction to a control target associated with an image displayed at the changed position is controlled according to the detected change. The control target is, for example, a device, a function, a file, software, or the like. Among them, plural objects may be control targets. In the first exemplary embodiment, the control target is a device.

Figure 2:
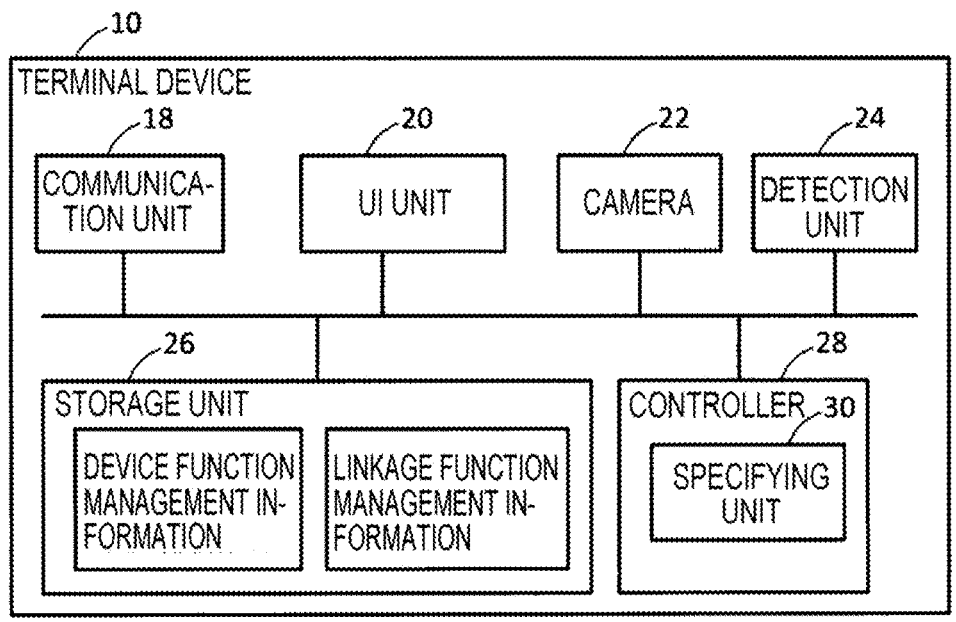
FIG. 2 is a block diagram illustrating a configuration of a terminal device.

Hereinafter, the configuration of the terminal device 10 will be described in detail with reference to FIG. 2.

A communication unit 18 is a communication interface and has a function of transmitting data to another device and a function of receiving data from another device. The communication unit 18 may be a communication interface having a wireless communication function or a communication interface having a wired communication function. For example, the communication unit 18 is compatible with one or plural types of communication methods and may communicate with a communication partner according to a communication method suitable for the communication partner (i.e., a communication method with which the communication partner is compatible). The communication method is, for example, infrared communication, visible light communication, Wi-Fi (registered trademark) communication, proximity wireless communication (e.g., near field communication (NFC), etc.), and the like. Examples of the proximity wireless communication include Felica (registered trademark), Bluetooth (registered trademark), RFID (Radio Frequency Identifier), and the like. Of course, other types of wireless communication may be used as proximity wireless communication. The communication unit 18 may switch the communication method or the frequency band depending on the communication partner, or switch the communication method or the frequency band depending on the surrounding environment.

A UI unit 20 is a user interface unit and includes a display unit and an operation unit. The display unit is a flexible display. The operation unit is an input device such as a touch panel or a keyboard. Of course, it may be a user interface that serves as a display unit and an operation unit (e.g., a touch-type display, a device for electronically displaying a keyboard or the like on a display, etc.). Further, the UI unit 20 may include a voice collecting unit such as a microphone or a voice generating unit such as a speaker. In this case, information may be input to the terminal device 10 by a voice input, or information may be generated by voice.

The display unit of the UI unit 20 displays thereon, for example, an image captured by the camera, an image associated with a device identified as a device to be used (e.g., a device used alone or a device to be linked), an image associated with a function, and the like. The image associated with the device may be an image (still image or moving image) representing the device captured by the camera, or may be an image schematically representing the device (e.g., an icon). For example, the schematically indicated image data may be created by a controller 28 of the terminal device 10, may be stored in advance in a storage unit 26 of the terminal device 10, may be stored in the server 16 and provided from the server 16 to the terminal device 10, or may be stored in another device and provided from the other device to the terminal device 10. The image associated with a function is, for example, an image such as an icon representing the function.

A camera 22 as an image capturing unit generates image data (e.g., still image data or moving image data) by capturing an object to be captured. The image is displayed on, for example, a display unit of the UI unit 20. The image displayed on the display unit may be operated by the user. Image data captured by an external camera may be transmitted to the terminal device 10 via a communication path, and the image may be displayed on the display unit of the UI unit 20. Even in this case, the image may be operated by the user.

A detection unit 24 has a function as a sensor for detecting a change in each position on the flexible display. Examples of the sensor include a pressure sensor, a temperature sensor, a humidity sensor, an acceleration sensor, a gyroscope sensor, and the like. The detection unit 24 detects a bending change, a pressure change, a capacitance change, an optical characteristic change, a temperature, a humidity, an acceleration, a direction, and the like for each portion of the flexible display (e.g., for each pixel). The temperature and humidity may be detected by sensors provided in devices other than the terminal device 10 (e.g., devices 12, 14, etc.).

A storage unit 26 is a storage device such as a hard disk or memory (e.g., SSD etc.). The storage unit 26 stores, for example, device function management information, linkage function management information, various data, various programs (e.g., an operating system (OS), various application programs (application software), etc.), information indicating the address of each device (device address information), information indicating the address of the server 16 (server address information), information on the identified device, information on the identified device to be linked, information on solo functions that the identified device has, information on the linkage functions, and the like. Of course, these may be stored in separate storage devices or may be stored in one storage device.

Hereinafter, the device function management information and the linkage function management information will be described.

The device function management information is information for managing a solo function that each device has. The device function management information includes, for example, information indicating an association among device identification information for identifying a device (device identification information), solo function information indicating a solo function that the device has, deformation operation information indicating a deformation operation performed on the flexible display, and execution solo function information indicating a solo function (including processing and operation) executed by the device when the deformation operation is performed among a solo function group that the device has.

The device identification information includes, for example, a device ID, a device name, information indicating the type of the device, the model number of the device, information for managing the device (e.g., asset management number, etc.), information indicating the location where the device is installed (position information of the device), a device image associated with the device, address information of the device, and the like. The device image is, for example, an external appearance image representing the device. The external appearance image may be an image representing the outside of the device (e.g., the casing of the device), an image representing a state where the casing is opened such that the inside thereof is seen from the outside (e.g., the internal structure), or an image representing a state where the device is covered with a packaging sheet or the like. The device image may be an image generated by capturing the device (such as an image representing the outside of the device or an image representing the inside), or an image imitating the device (e.g., an icon).

The solo function information includes, for example, a function ID, a function name, and the like. For example, when the device 12 is an image forming device and the image forming device has a print function, a scan function, and a copy function, the device identification information of the image forming device has, as an example, solo function information indicating the print function, function information indicating the scan function, and solo function information indicating the copy function, which are associated with each other.

The deformation operation is, for example, a bending operation, a folding operation, a winding operation, a twisting operation, a stretching operation, or the like, performed on the flexible display. In addition, information indicating the direction of the deformation operation (e.g., a bending direction, a folding direction, a winding direction, a twisting direction, a stretching direction, etc.) may be included in the deformation operation information.

By referring to the device function management information, the solo function that the device has is specified (identified), and the execution solo function executed according to the deformation operation performed on the flexible display is specified (identified).

The device managed by the device function management information is, for example, a device (e.g., the device 12 or 14) included in the information processing system. Of course, devices not included in the information processing system may be managed by the device function management information. For example, the terminal device 10 may acquire information on a new device not included in the information processing system (information including device identification information, solo function information, deformation operation information, and execution solo function information) and newly register the information in the device function management information. The information on the device may be acquired, for example, by using the Internet or the like, or may be input by a user, an administrator or the like. Further, the terminal device 10 may update the device function management information at any timing, regularly, or at a timing designated by a user, an administrator or the like. Thus, in some cases, solo function information indicating a solo function that the device does not have before updating but the device has after updating may be registered in the device function management information. Similarly, in some cases, solo function information indicating a solo function that the device has before updating but the device does not have after updating may be deleted from or registered as unusable information in the device function management information. The information for updating may be acquired, for example, by using the Internet or the like, or may be input by a user, an administrator or the like. Of course, the terminal device 10 itself may not perform acquisition of information on the device and generation or update of the device function management information, but an external device such as the server 16 may perform the acquisition of information on the device and the generation or update of the device function management information. In this case, the device function management information generated or updated by the external device is transmitted from the external device to the terminal device 10, and is stored in the storage unit 26.

The linkage function management information is information for managing linkage functions executed by linking plural functions to each other. When plural functions are linked to each other, one or plural linkage functions are executed. For example, the linkage functions may be functions executable by linking plural functions that a single device (e.g., the device 12) has to each other, or solo functions executable by linking plural functions that plural devices (e.g., the devices 12 and 14) have to each other. Further, the terminal device 10 issuing the operation instruction may also be used as a device to be linked, and the solo function that the terminal device 10 has may also be used as a part of the linkage functions.

The linkage function may be a function executed without using a device as hardware. For example, the linkage function may be a function executed by linking plural software to each other. Of course, the linkage function may be a function executed by linking the function that the device as hardware has and the function implemented by software to each other.

The linkage function management information is information indicating, for example, an association among a combination of solo function information indicating respective solo functions used in the linkage function, linkage function information indicating the linkage function, deformation operation information indicating the deformation operation performed on the flexible display, and execution linkage function information indicating the linkage function (process or operation) executed when the deformation operation is performed.

The linkage function information includes, for example, a linkage function ID, a linkage function name, or the like. When a solo function is updated, the linkage function management information is also updated along with the update. As a result, the linkage function by plural solo functions that are unable to be linked to each other before updating may become usable after updating, and on the contrary to this, the linkage function that is usable before updating may become unusable after updating. The linkage function information indicating the linkage function that becomes usable after updating is registered in the linkage function management information, and the linkage function information indicating the linkage function that became unusable after updating is deleted from or registered as unusable information in the device function management information. The update of the linkage function management information may be performed by the terminal device 10 or may be performed by an external device such as the server 16. When the update of the linkage function management information is executed by an external device, the updated linkage function management information is transmitted from the external device to the terminal device 10, and is stored in the storage unit 26.

In the case of linking plural devices to each other, the linkage function management information is information for managing a linkage function executable using the plural devices, and is information indicating an association among a combination of device identification information for identifying the respective devices used in the linkage function, linkage function information indicating the linkage function, operation information indicating the deformation operation, and execution linkage function information indicating a linkage function executed when the deformation operation is performed, among a linkage function group executable using the plural devices. Further, in a case of linking a device that has plural output functions (a device that outputs an output to a user and has plural output functions) and a sensing device that does not have an output function (a device that does not output any output to a user), the linkage function management information may include information indicating a combination of a specific sensing device and a specific output function of the plural output functions. Therefore, the output function used in combination with a specific sensing device is specified from among the plural output functions.

The linkage function may be a function executable by linking plural solo functions, which are different from each other, to each other, or by linking identical solo functions to each other. The linkage function may be a function that is unusable before the linkage. The function that is unusable before the linkage may be a solo function that is usable by using an identical solo function among the functions that devices to be linked have or that is usable by combining different solo functions. For example, when a device having a print function (printer) and a device having a scan function (scanner) are linked to each other, a copy function is implemented as a linkage function. That is, the copy function is implemented by linking the print function and the scan function to each other. In this case, the copy function as a linkage function and a combination of the print function and the scan function are associated with each other. In the linkage function management information, for example, linkage function information indicating the copy function as a linkage function is associated with a combination of device identification information for identifying a device having a print function and device identification information for identifying a device having a scan function.

Of course, the linkage function may be not only a function implemented by a combination of plural solo functions but also a function implemented by a combination of one or plural other linkage functions and one or plural solo functions, or may be a function implemented by a combination of plural other linkage functions.

The concept of the linkage function may include a coalescing function enabling a new function to be executed by linking plural solo functions or plural devices to each other. For example, an extended display function may be implemented as a coalescing function by combining plural displays. As another example, a recording function may be implemented as a coalescing function by combining a television and a recorder. The recording function may be a function of recording an image displayed on the television. In addition, a capturing area extension function may be implemented as a coalescing function by combining plural cameras. The extension function is, for example, a function of capturing by connecting the capturing areas of the respective cameras. In addition, a translated call function (a function for translating a conversation via a telephone) may be implemented as a coalescing function by combining a telephone with a translator or translation software. As described above, the concept of the linkage function includes a function that may be implemented by linking the same types of devices or solo functions to each other and a function that may be implemented by linking different types of devices or solo functions to each other.

A controller 28 controls the operation of each unit of the terminal device 10. The controller 28 controls, for example, communication by the communication unit 18, display of information on the display unit of the UI unit 20, writing information to the storage unit 26, reading information from the storage unit 26, and the like. Further, the controller 28 includes a specifying unit 30.

The specifying unit 30 has a function of specifying solo functions that a device has or a linkage function executable using one or plural devices. Further, the specifying unit 30 has a function of, when a deformation operation is performed on the flexible display, specifying an execution solo function corresponding to the deformation operation or an execution linkage function corresponding to the deformation operation.

For example, the specifying unit 30 receives device identification information for identifying the device and specifies solo function information indicating a solo function associated with the device identification information in the device function management information stored in the storage unit 26. Thereby, the solo function that the device has is specified (identified). Further, when a deformation operation is performed on the flexible display, the deformation operation (e.g., a bending operation or the like) is detected by the detection unit 24. The specifying unit 30 specifies execution solo function information indicating an execution solo function associated with the deformation operation in the device function management information. As a result, the solo function executed when the deformation operation is performed on the flexible display is specified (identified).

The controller 28 controls notification (guidance) of information on the solo function specified by the specifying unit 30 (e.g., solo function information, execution solo function information, solo function explanation information, and the like). As the notification, the controller 28 may cause the display unit (flexible display) of the UI unit 20 to display the information on the solo function, or may use a speaker or the like to issue information on the solo function as voice information. Further, the controller 28 may control the execution of the solo function. That is, the controller 28 may cause the device to execute the solo function.

The process of specifying the solo function may be performed by the server 16. In this case, the device identification information is transmitted from the terminal device 10 to the server 16, and the server 16 specifies solo function information indicating a solo function associated with the device identification information. In the case where the specifying process is performed by the server 16, the device function management information is stored in the server 16. The information on the solo function may be transmitted from the server 16 to the terminal device 10 and displayed on the display unit of the UI unit 20 or issued as voice information. Similarly, the process of specifying the execution solo function corresponding to the deformation operation may be performed by the server 16. In this case, deformation operation information is transmitted from the terminal device 10 to the server 16, and the server 16 specifies execution solo function information indicating an execution solo function associated with the deformation operation information. The execution solo function information may be transmitted from the server 16 to the terminal device 10 and displayed on the display unit of the UI unit 20 or issued as voice information.

Further, the specifying unit 30 receives the device identification information for identifying respective devices to be linked and specifies linkage function information indicating a linkage function associated with a combination of the respective device identification information in the linkage function management information stored in the storage unit 26. Therefore, the linkage function executable by linking the solo functions that the devices to be linked have is specified (identified). Further, when a deformation operation is performed on the flexible display, the deformation operation is detected by the detection unit 24. The specifying unit 30 specifies execution linkage function information indicating an execution linkage function associated with the deformation operation in the linkage function management information.

The controller 28 controls notification (guidance) of information on the linkage function specified by the specifying unit 30 (e.g., linkage function information, execution linkage function information, linkage function explanation information, and the like). The controller 28 may cause the display unit (flexible display) of the UI unit 20 to display the information on the linkage function, or may issue information on the linkage function as voice information. Further, the controller 28 may control the execution of the linkage function. That is, the controller 28 may cause plural devices to be linked to execute the linkage function.

The specifying unit 30 may receive solo function information indicating respective solo functions used for the linkage function and specify the linkage function information indicating the linkage function associated with a combination of the respective solo function information in the linkage function management information. Therefore, the linkage function executable by linking the respective solo functions to be linked is specified (identified).

The process of specifying the linkage function may be performed by the server 16. In this case, plural pieces of device identification information are transmitted from the terminal device 10 to the server 16, and the server 16 specifies linkage function information indicating a linkage function associated with the plural pieces of device identification information. In the case where the specifying process is performed by the server 16, the linkage function management information is stored in the server 16. The information on the linkage functions may be transmitted from the server 16 to the terminal device 10 and displayed on the display unit of the UI unit 20 or issued as voice information. Similarly, the process of specifying the execution linkage function corresponding to the deformation operation may be performed by the server 16. In this case, deformation operation information is transmitted from the terminal device 10 to the server 16, and the server 16 specifies execution linkage function information indicating an execution linkage function associated with the deformation operation information. The execution linkage function information may be transmitted from the server 16 to the terminal device 10 and displayed on the display unit of the UI unit 20 or issued as voice information.

Functions usable by a user (a solo function or a linkage function) may be managed for each user. The management may be performed by the terminal device 10 or may be performed by an external device such as the server 16. The functions usable by a user include, for example, a function provided free of charge to the user, a function provided to the user for a fee and purchased by the user, and the like. Usable function information indicating functions usable by the user (e.g., function purchase history information) may be created and managed for each user. When the management of the usable functions is performed by the terminal device 10, the usable function information is stored in the storage unit 26. When the management is performed by an external device such as the server 16, the usable function information is stored in the external device. Of course, there are also functions that may be used for free, additional update functions, and functions that are specially managed by an administrator. Therefore, the usability of the function may not be determined based on the presence or absence of purchase. The process of purchasing the functions is performed, for example, by an external device such as the server 16.

The usable function management information is information for managing the functions usable by respective users. The usable function management information is, for example, information indicating an association between user identification information for identifying a user and function information indicating a function usable by the user (including solo function information and linkage function information). As described above, the function usable by the user is, for example, a function provided free of charge to the user, a function purchased by the user, and the like, which may be a single function or a linkage function. The user identification information is, for example, user account information such as user ID and name. The functions usable by each user are specified (identified) by referring to the usable function management information. The usable function management information may be updated, for example, each time when a function is provided to the user (e.g., each time when a function is provided to the user free of charge or at a cost).

When the functions usable by a user are managed, the specifying unit 30 may receive user identification information for identifying the user and specify function information indicating respective functions associated with the user identification information in the usable function management information (e.g., the information stored in the terminal device 10 or server 16). As a result, functions usable by the user are specified (identified). The controller 28 may cause the display unit of the UI unit 20 to display the information on the specified function, or may issue the information as voice information. For example, the specifying unit 30 receives the device identification information and the user identification information, specifies solo function information indicating a solo function associated with the device identification information in the device function management information, and further specifies function information indicating a function associated with the user identification information (including a solo function and a linkage function) in the usable function management information. As a result, the solo function, that the device specified by the device identification information has and that is usable by the user identified by the user identification information, is specified.

The functions usable by the user may be specified by an external device such as the server 16. In this case, the user identification information is transmitted from the terminal device 10 to the server 16, and the server 16 specifies function information indicating respective functions associated with the user identification information. In the case where the specifying process is performed by the server 16, the usable function information is stored in the server 16. Information on each function usable by the user may be transmitted from the server 16 to the terminal device 10 and displayed on the display unit of the UI unit 20 or issued as voice information.

Figure 3:
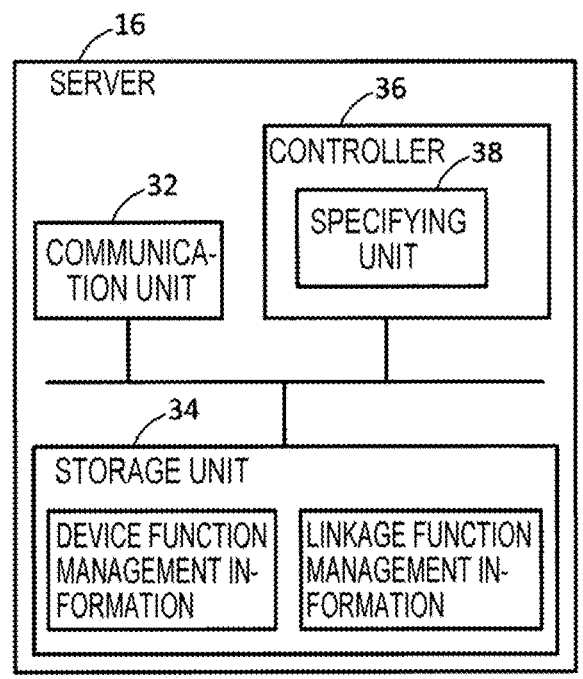
FIG. 3 is a block diagram illustrating a configuration of a server.

Hereinafter, the configuration of the server 16 will be described in detail with reference to FIG. 3. FIG. 3 illustrates the configuration of the server 16.

A communication unit 32 is a communication interface and has a function of transmitting data to another device and a function of receiving data from another device. The communication unit 32 may be a communication interface having a wireless communication function or a communication interface having a wired communication function.

A storage unit 34 is a storage device such as a hard disk or memory (e.g., SSD etc.). The storage unit 34 stores, for example, various data, various programs, terminal address information of the terminal device 10, device address information of each device, server address information of the server 16, and the like. Of course, these may be stored in separate storage devices or may be stored in one storage device.

When the solo functions that the respective devices have and the linkage functions are managed by the server 16, the above-described device function management information and linkage function management information may be stored in the storage unit 34, and then, the device function management information and the linkage function management information may be updated in the server 16. In this case, when a process of specifying the device is performed by the terminal device 10, the device function management information and the linkage function management information (the updated information when the information is updated) are transmitted from the server 16 to the terminal device 10. The transmission may be performed regularly or at a designated timing. Thus, the information stored in the terminal device 10 is updated. Of course, the specifying unit 30 of the terminal device 10 may specify solo functions or linkage functions by referring to the device function management information or the linkage function management information stored in the server 16. Further, the process of specifying the function may be performed by the server 16. When the device function management information is stored in the server 16, the device function management information may not be stored in the terminal device 10. Similarly, when the linkage function management information is stored in the server 16, the linkage function management information may not be stored in the terminal device 10.

The controller 36 controls the operation of each unit of the server 16. The controller 36 controls, for example, communication by the communication unit 32, writing information to the storage unit 34, reading information from the storage unit 34, and the like. Further, the controller 36 may have the specifying unit 38 having the same function as that of the specifying unit 30 of the terminal device 10. Similarly to the specifying unit 30 of the terminal device 10, the specifying unit 38 specifies a solo function and a linkage function. When the server 16 performs the process of specifying the solo function and the linkage function, the terminal device 10 may not have the specifying unit 30.

The controller 36 may execute a process of purchasing a function and manage the history of the purchase. For example, when a charged function is purchased by a user, the controller 36 may apply a charging process to the user.

When usable function management information is created, the usable function management information may be stored in the server 16. In this case, the usable function management information may not be stored in the terminal device 10. The controller 28 of the terminal device 10 may manage the history of the purchase of functions by a user. In this case, the controller 36 of the server 16 may not have the management function thereof.

As still another example, the device function management information and the linkage function management information may be stored in the devices such as the devices 12 and 14, or the devices such as the devices 12 and 14 may have the specifying unit 30. That is, the process by the specifying unit 30 may be performed in the terminal device 10, the devices such as the devices 12 and 14, the server 16, or another device.

Figure 4:
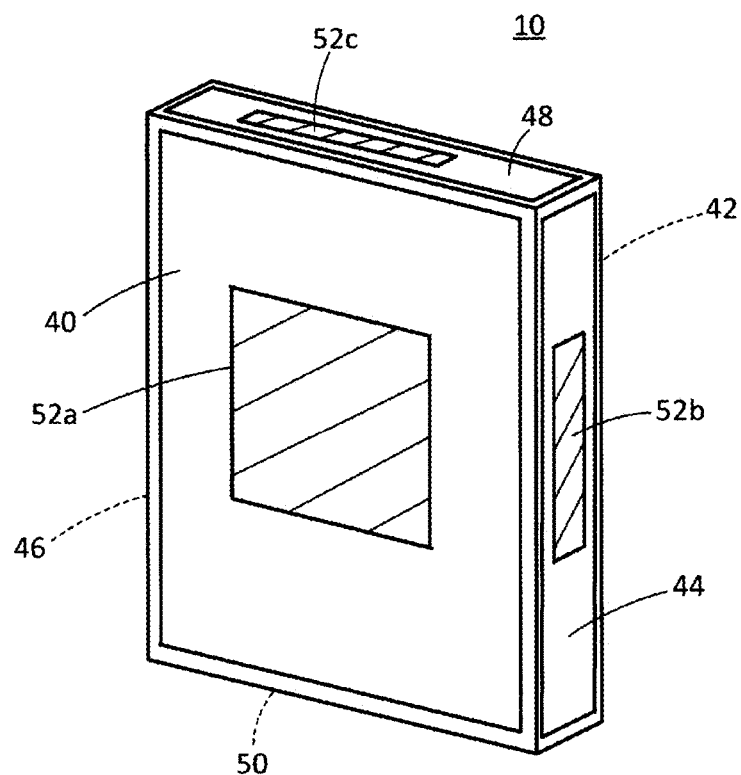
FIG. 4 is a perspective diagram illustrating a flexible display.

Hereinafter, a flexible display provided in the terminal device 10 will be described with reference to FIG. 4. FIG. 4 is a perspective diagram schematically illustrating an external appearance of a flexible display. In the example illustrated in FIG. 4, the terminal device 10 itself constitutes a flexible display, so that the terminal device 10 itself is deformable. Of course, in the terminal device 10, the flexible display and the other configurations may be separated from each other.

As an example, the terminal device 10 has a rectangular parallelepiped shape, and includes a front side display 40 provided on the front surface of the terminal device 10, a rear side display 42 (not illustrated in FIG. 4) provided on the rear surface thereof, lateral side displays 44 and 46 (the lateral side display 46 is not illustrated in FIG. 4) provided on the lateral surfaces thereof, an upper side display 48 provided on the upper surface thereof, and a lower side display 50 (not illustrated in FIG. 4) provided on the lower surface thereof.

When an object to be displayed is a three-dimensional object, the front side of the three-dimensional object may be displayed on the front side display 40, the rear side of the three-dimensional object may be displayed on the rear side display 42, the lateral sides of the three-dimensional object may be displayed on the lateral side displays 44 and 46, the upper side of the three-dimensional object may be displayed on the upper side display 48, and the lower side of the three-dimensional object may be displayed on the lower side display 50. For example, an image 52a representing the front side of the three-dimensional object is displayed on the front side display 40, an image 52b representing one lateral side of the three-dimensional object is displayed on one lateral side display 44, and an image 52c representing the upper side of the three-dimensional object is displayed on the upper side display 48. Corresponding images are also displayed on the rear side display 42, the other lateral side display 46, and the lower side display 50, respectively.

When an object to be displayed is a three-dimensional object, the three-dimensional object may be output by a 3D printer. Of course, even when the object to be displayed is a three-dimensional object, the image of the three-dimensional object may be converted into a two-dimensional planar image (for example, converted by projection) and output as a planar image. Further, the object to be displayed may be printed for each individual side, or the object to be displayed may be printed before and after the change of the object to be displayed.

The flexible display holds image information for each portion (e.g., for each pixel). For example, the flexible display holds image information for each unit portion (e.g., pixel) in a three-dimensional space (e.g., a space defined by X axis, Y axis, and Z axis orthogonal to each other). As another example, the flexible display may manage the image information for each two-dimensional plane (two-dimensional layer).

As described above, the detection unit 24 detects a change in each position of the flexible display (the terminal device 10 itself in the example illustrated in FIG. 4). In the example illustrated in FIG. 4, the detection unit 24 detects changes in the front surface, the rear surface, both lateral surface, the upper surface, and the lower surface.

The flexible display illustrated in FIG. 4 is merely an example. The display units may not be provided on the rear surface, the lateral surfaces, the upper surface, and the lower surface. Alternatively, the display units may be provided on the front surface and the rear surface. Further, the flexible display may be a display having a wholly or partially curved display unit (a display unit having a curved surface), a winding type display, or a slide type display. Even a display other than these displays may be included in the category of the flexible display according to the first exemplary embodiment as long as it is a display capable of changing its shape.

In the first exemplary embodiment, as an example, the device identification information is acquired by using an augmented reality (AR) technology so that the device is identified. For example, by using the AR technology, the device identification information of the device used alone is acquired, so that the device is identified, and the device identification information of the device to be linked is acquired, so that the device to be linked is identified. As the AR technology, any AR technology of the related art is used. Examples of the AR technology include an image AR technology using image analysis, a position AR technology using position information, and the like. Examples of the image AR technology include a marker AR technology using a marker such as a two-dimensional barcode, a markerless AR technology using an image recognition technology, and the like. Of course, the device identification information may be acquired without using the AR technology, and then the device may be identified. For example, when the device is connected to the network, the device may be identified based on the IP address, or the device ID may be read to identify the device. Further, in a case of using a device or a terminal device having various wireless communication functions such as infrared communication, visible light communication, Wi-Fi, Bluetooth, etc., the ID of the device may be acquired using the wireless communication function, so that the device is identified.

Figure 5:
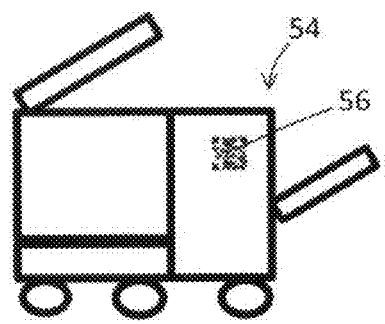
FIG. 5 is a schematic diagram illustrating an external appearance of the image forming device.

Hereinafter, the process of acquiring the device identification information will be described in detail with reference to FIG. 5. FIG. 5 schematically illustrates the external appearance of a multifunction device 54 as an exemplary device. The multifunction device 54 is, for example, a device having at least one function of a print function, a scan function, a copy function, or a facsimile function. Here, a process for acquiring device identification information of the multifunction device 54 by applying the marker AR technology will be described. A marker 56 such as a two-dimensional barcode or the like is provided on the casing of the multifunction device 54. The marker 56 is information in which the device identification information of the multifunction device 54 is encoded. When a user captures the marker 56 with the camera 22 of the terminal device 10, image data representing the marker 56 is generated. The specifying unit 30 of the terminal device 10 extracts the device identification information by applying a decoding process to the marker image represented in the image data. Thereby, the multifunction device 54 is identified. Next, the specifying unit 30 specifies solo function information indicating a solo function associated with the extracted device identification information in the device function management information. Thereby, the solo function that the multifunction device 54 has is specified (identified).

The specifying unit 38 of the server 16 may extract the device identification information by applying the decoding process to the image data representing the marker 56. In this case, image data is transmitted from the terminal device 10 to the server 16, and the decoding process is applied to the image data in the server 16. Further, in the server 16, the solo function associated with the device identification information may be specified.

Solo function information indicating the solo function that the multifunction device 54 has may be coded and included in the marker 56. In this case, when the decoding process is applied to the image data representing the marker 56, the device identification information of the multifunction device 54 is extracted, and the solo function information indicating the solo function that the multifunction device 54 has is extracted as well. As a result, the multifunction device 54 is specified (identified), and the solo function that the multifunction device 54 has is specified (identified). The decoding process may be performed by the terminal device 10 or may be performed by the server 16. Further, deformation operation information and execution solo function information may be coded and included in the marker 56.

In a case of acquiring the device identification information by applying the markerless AR technology, for example, the user captures the entirety or a part of the external appearance of the device (e.g., the multifunction device 54) with the camera 22 of the terminal device 10. Of course, it is useful to acquire information for identifying a device such as the name (e.g., product name), a model number, or an asset management number of the device, from the external appearance. External appearance image data representing the entirety or a part of the external appearance of the device is generated by image capturing. The specifying unit 30 of the terminal device 10 identifies the device based on the external appearance image data. For example, the storage unit 26 of the terminal device 10 stores, for each device, external appearance image association information indicating an association between the external appearance image data representing the entirety or a part of the external appearance of the device and the device identification information of the device. For example, the specifying unit 30 compares the external appearance image data with each external appearance image data included in the external appearance image association information, and specifies the device identification information of the device based on the comparison result. For example, the specifying unit 30 extracts features of the external appearance of the device from the appearance image data, specifies the external appearance image data representing the same or similar features as or to the features of the external appearance in the external appearance image data group included in the external appearance image association information, and specifies the device identification information associated with the external appearance image data. Thereby, the device is identified. As another example, when the name (e.g., product name) or model number of the device is captured and external appearance image data representing the name or model number is generated, the device may be identified based on the name or model number indicated in the external appearance image data. The specifying unit 30 specifies solo function information indicating a solo function associated with the specified device identification information in the device function management information. Thereby, the solo function that the device has is specified.

The specifying unit 38 of the server 16 may compare the external appearance image data representing all or a part of the external appearance of the device with each external appearance image data included in the external appearance image association information, and specify the device identification information of the device based on the comparison result.

When acquiring the device identification information by applying the position AR technology, position information indicating a position where the device is installed is acquired by using, for example, the global positioning system (GPS) function. For example, each device has the GPS function and acquires device position information indicating the position of the device itself. The terminal device 10 outputs information indicating a device position information acquisition request to the device to be used, and receives device position information of the device from the device as a response to the acquisition request. The specifying unit 30 of the terminal device 10 identifies the device based on the device position information. For example, the storage unit 26 of the terminal device 10 stores, for each device, position association information indicating an association between the device position information indicating the position where the device is installed and the device identification information of the device. The specifying unit 30 specifies the device identification information associated with the device position information in the position association information. Thereby, the device is specified (identified). The specifying unit 30 specifies solo function information indicating a solo function associated with the specified device identification information in the device function management information. Thereby, the solo function that the device has is specified (identified).

The specifying unit 38 of the server 16 may specify the device identification information associated with the position information of the device in the position association information.

Devices may be identified using plural identification technologies. For example, the devices may be identified using plural technologies selected from the marker AR technology, the markerless AR technology, and the position AR technology. Further, when a device is not identified by a certain identification technology, the device may be identified using another identification technology. For example, when a device is not identified by the marker AR technology or the markerless AR technology, the device may be identified using the position AR technology.

Hereinafter, the information processing system according to the first exemplary embodiment will be described in more detail.

The device function management information will be described in detail with reference to FIG. 6. FIG. 6 illustrates an exemplary device function management table as the device function management information. In the device function management table, as an example, the device ID, the information indicating the device name (e.g., the type of the device), the information indicating the solo function that the device has (solo function information), the deformation operation information indicating the deformation operation performed on the flexible display, the execution solo function information which is a solo function to be executed by the device when the deformation operation is performed, among the solo function group that the device has, and the image ID are associated with each other. The device ID and the device name are examples of the device identification information. The image ID is an example of image identification information for identifying a device image associated with the device. The device function management table may not include the image ID.

For example, a device whose device ID is "B" is a multifunction device, and has solo functions such as a print function and a scan function. Further, the multifunction device is associated with an image ID for identifying a device image associated with the multifunction device. The data of the device image associated with the device may be stored in, for example, the terminal device 10, the server 16, or another device.

For example, the device ID for identifying the device (e.g., the multifunction device (B)) is acquired by applying the AR technology. The specifying unit 30 of the terminal device 10 specifies the device name, the solo function, and the image ID associated with the device ID by referring to the device function management table. Thereby, the multifunction device (B) is identified. Information indicating the device name or the device image may be displayed on the display unit of the UI unit 20. Of course, the image itself captured by the camera 22 may be displayed on the display unit of the UI unit 20. Further, when the device image associated with the multifunction device (B) (e.g., an image captured by the camera 22 or an image schematically representing the multifunction device (B)) is designated by the user in the UI unit 20, information on a solo function that the multifunction device (B) has (e.g., solo function information, explanation information on the solo function, etc.) may be displayed on the display unit of the UI unit 20. Further, when a specific deformation operation is performed by the user on the flexible display in a state where the multifunction device (B) is identified and displayed on the flexible display, the specifying unit 30 specifies the execution solo function corresponding to the deformation operation. The execution solo function may be executed by the multifunction device (B), or information indicating the execution solo function may be displayed on the flexible display.

Each device is associated with one or plural deformation operations, and each deformation operation is associated with the same or different execution solo functions. For example, it is assumed that the multifunction device (B) is associated with plural deformation operations (e.g., deformation operations b1, b2, . . . ), the deformation operation b1 is associated with a print function, and the deformation operation b2 is associated with a scan function. Further, when the deformation operation b1 performed on the flexible display is detected by the detection unit 24, the specifying unit 30 specifies the print function as an execution solo function associated with the deformation operation b1. In this case, the controller 28 may cause the display unit of the UI unit 20 to display information indicating the print function, may output the information as voice information, or may cause the multifunction device (B) to execute printing by giving a print instruction to the multifunction device (B).

Hereinafter, the linkage function management information will be described in detail with reference to FIG. 7. FIG. 7 illustrates an exemplary linkage function management table as the linkage function management information. In the linkage function management table, as an example, a combination of device IDs, information indicating the device names (e.g., the type of the devices), information indicating single functions that the devices have (single function information), deformation operation information indicating the deformation operation performed on the flexible display, and execution linkage function information indicating a linkage function to be executed when the deformation operation is performed, among a linkage function group executable using plural devices to be linked are associated with each other.

For example, the device whose device ID is "A" is a PC (personal computer), and the device whose device ID is "B" is a multifunction device. When the PC (A) and the multifunction device (B) are linked to each other, for example, a "scan transfer function" and a "print function" are implemented as linkage functions. The "scan transfer function" is a function of transferring image data generated by scanning by the multifunction device (B) to the PC (A). The "print function" is a function of transmitting data (e.g., image data and document data) stored in the PC (A) to the multifunction device (B) and printing it with the multifunction device (B). A linkage function executable using three or more devices may be specified. In this case, a combination of three or more devices and a linkage function are associated with each other, and the association is registered in the linkage function management table.

A combination of the plural devices is associated with one or more deformation operations, and each deformation operation is associated with the same or different execution linkage functions. For example, a combination of the PC (A) and the multifunction devices (B) is associated with plural deformation operations, and each deformation operation is associated with the same or different execution linkage functions. When a certain deformation operation is detected by the detection unit 24, the specifying unit 30 specifies an execution linkage function associated with the deformation operation. In this case, the controller 28 may cause the display unit of the UI unit 20 to display information indicating the execution linkage function, may output the information as voice information, or may cause the PC (A) and the multifunction device (B) to execute the execution linkage function by giving an execution instruction thereof to the multifunction device (B).

Hereinafter, specific examples of the first exemplary embodiment will be described in detail.

Example 1

Figure 8:
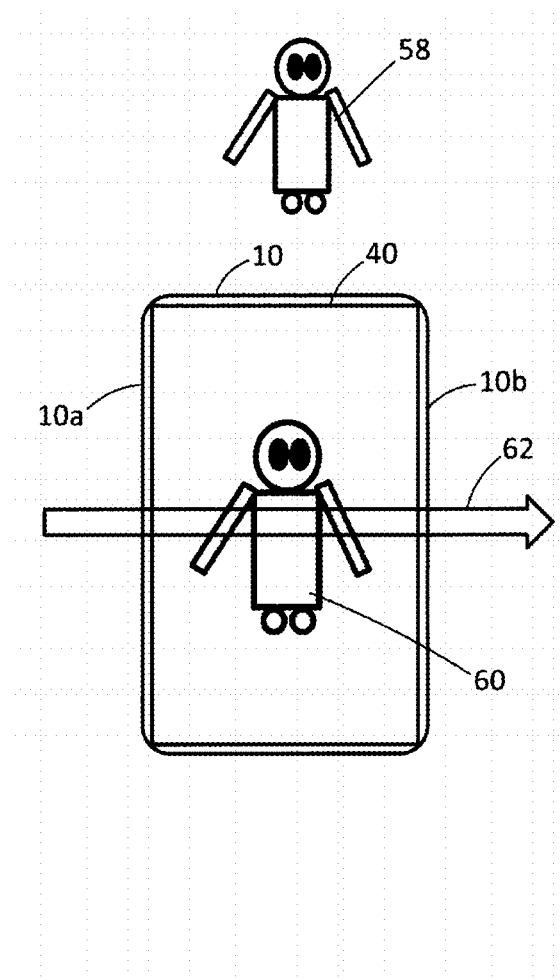
FIG. 8 is a schematic diagram illustrating a device and a terminal device.

Example 1 will be described. In FIG. 8, the robot 58 and the terminal device 10 are illustrated. The robot 58 is an exemplary device. The robot 58 and the terminal device 10 are devices existing in a real space. The robot 58 is identified by the specifying unit 30, using the above-mentioned AR technology or other identification technologies. In the example illustrated in FIG. 8, the robot 58 has a face portion facing forward and faces the user (terminal device 10).

A device image 60 is displayed on the front side display 40 (an example of the display unit of the UI unit 20) of the terminal device 10. The device image 60 is an image associated with the robot 58. The device image 60 may be an image generated by capturing the robot 58 (an image having a size at the time of image capturing, or an enlarged or reduced image) or an image schematically representing the robot 58 (e.g., an icon). The device image 60 is an image representing the external appearance state of the robot 58. In the example illustrated in FIG. 8, the image represents the state of the external appearance of the robot 58 with the face portion facing forward. The user may operate the UI unit 20 to change the display position and display size of the device image 60.

When a schematic image is used, the specifying unit 30 specifies a schematic image associated with the identified device by referring to the device function management table illustrated in FIG. 6. The schematic image is displayed as a device image. The data of the schematic image may be stored in the terminal device 10 or may be stored in an external device such as the server 16.

The image data generated by capturing the device is image data that reflects the external appearance of the current device itself (e.g., scratches, memo, or external appearance reflecting a seal affixed on the device, etc.), so that the user may see the difference visually from other similar devices.

Further, when a device is identified, information indicating the name of the device (corresponding to an example of device identification information) may be displayed. For example, the character string "robot" may be displayed together with the device image 60. The device image 60 may not be displayed, and information indicating the name of the robot 58 may be displayed.

In addition, the information on the devices identified in the past may be stored in the storage unit 26 of the terminal device 10. Thereafter, even though the identifying process is not performed again on the device, the device image associated with the device may be displayed. Of course, the information on the identified device may be deleted from the storage unit 26 by the operation of the user. In this case, the device image associated with the device is also deleted. As another example, after a solo function or a linkage function is executed using the identified device, or after a predetermined time elapses from the time point when the device is identified, information on the identified device may be deleted from the storage unit 26.

When the user performs a deformation operation on the flexible display (the terminal device 10 itself in the example illustrated in FIG. 8) while the device image 60 is displayed, the detection unit 24 of the terminal device 10 detects the deformation operation, and the specifying unit 30 specifies the execution solo function associated with the deformation operation in the device function management table illustrated in FIG. 6. The controller 28 causes the robot 58 to execute the execution solo function. When the controller displays information indicating the execution solo function on the flexible display and the user gives an execution instruction, the controller 28 may cause the robot 58 to execute the execution solo function. Further, the controller 28 changes the device image 60 according to the deformation operation. Hereinafter, the process will be described in detail.

The detection unit 24 of the terminal device 10 detects the change (deformation) of the flexible display and specifies the position where the change occurs. Next, the controller 28 specifies the content (e.g., the device image 60) displayed at the position where the change occurs, and changes the substance of the content. When the device image is not displayed and information indicating the content (e.g., a character string indicating the name of the robot 58) is displayed, the controller 28 may specify the information indicating the content displayed at the position where the change occurs (e.g., a character string). For example, the controller 28 may add a color or image to the content, delete a part or all of the content, or replace the content with other content (another image). When a new deformation operation is not detected after the content is changed, the controller 28 may maintain the displayed content after the change, or may return the displayed content to the content before the change after a predetermined time elapses. Further, the specifying unit 30 specifies the device (e.g., the robot 58) associated with the content and specifies the execution solo function associated with the deformation operation. The controller 28 causes the device associated with the content to execute the execution solo function. The order of the process of changing the content and the process of specifying the device associated with the content may be reversed from the above order, or the processes may be performed simultaneously.

Figure 9:
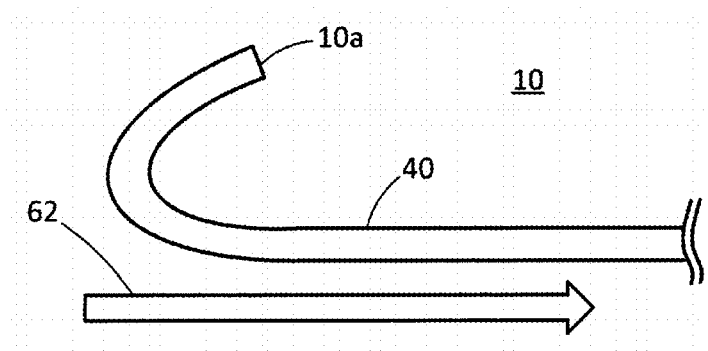
FIG. 9 is a diagram illustrating a state where the flexible display is viewed from the bottom.

Hereinafter, a specific example will be described. It is assumed that a user bends the whole of a left side portion 10*a* of the flexible display (terminal device 10 itself) toward a right side portion 10*b* of the flexible display. That is, it is assumed that the user bends the flexible display in the direction of an arrow 62 illustrated in FIG. 8. FIG. 9 illustrates a state when the terminal device 10 is viewed from the lower side (the lower side display 50 side) of the terminal device 10. The left side portion 10*a* of the flexible display is bent in the direction of the arrow 62 (the direction toward the right side portion 10*b*).

The detection unit 24 detects the change (deformation) of the flexible display caused by the above-described bending operation, and specifies the position where the change occurs. The controller 28 specifies the device image displayed at that position. When a change occurs at the position where the device image 60 is displayed due to the above-described bending operation, the controller 28 identifies the device image 60 as the image to be changed. Further, the specifying unit 30 identifies the robot 58 associated with the device image 60 as a control target, and refers to the device function management table illustrated in FIG. 6 to specify the execution solo function associated with the bending operation (one mode of the deformation operation) among the solo function group that the robot 58 has. For example, it is assumed that the execution solo function is a function (an operation or a process) of directing the face portion of the robot 58 in the direction in which the flexible display is bent.

Figure 10:
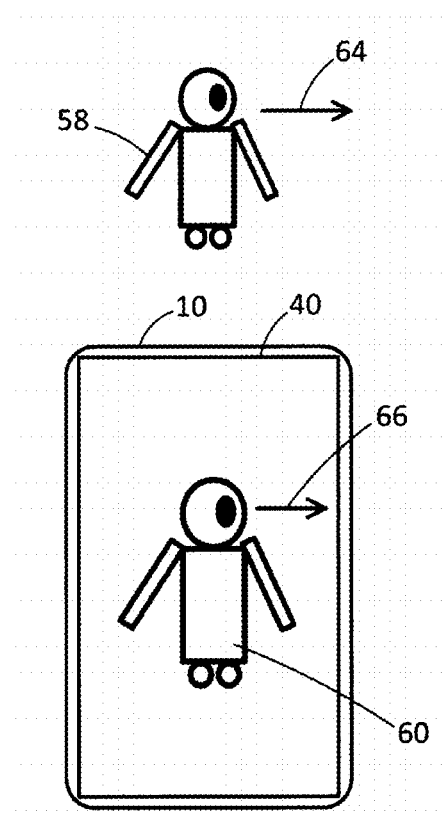
FIG. 10 is a schematic diagram illustrating a device and a terminal device.

The controller 28 transmits to the robot 58 control information for causing the robot 58 to execute the execution solo function specified as described above. For example, the controller 28 acquires address information of the robot 58, establishes communication with the robot 58 using the address information, and transmits the control information to the robot 58. According to the control information, the robot 58 moves its own head (rotates the head about the neck) as illustrated in FIG. 10, to direct the face portion in the same direction of an arrow 64 (the right direction as viewed from the user) as the direction in which the flexible display is bent (the direction of the arrow 62). Further, the controller 28 directs the head image in the device image 60 in the direction of an arrow 66 (the right direction as viewed from the user) which is the same as the direction of the arrow 62. As a result, the device image 60 after the change represents the actual state of the robot 58 (the state where the face portion faces rightward when viewed from the user).

The controller 28 may control notification of the specified execution solo function and may cause the robot 58 to execute the execution solo function when the execution instruction is given by the user. For example, as the notification of the execution solo function, the controller 28 may cause the flexible display to display information indicating the execution solo function, or may output information indicating the execution solo function as voice information.

According to Example 1, when the user deforms the flexible display, a function (an operation or a process) corresponding to the deformation is executed by the device. Thereby, with a simple operation, the function is executed by the device. Further, the result of execution of the function is reflected in the device image.

Further, the device may operate in conjunction with the speed of the deformation operation. In the above example, as the bending speed of the flexible display increases, the rotational speed of the head of the robot 58 increases.

The controller 28 may change the execution solo function according to the mode of the deformation operation (the mode of change of the flexible display detected by the detection unit 24). For example, the operation of folding the flexible display and the operation of twisting the flexible display are associated with different execution solo functions, respectively, and the specifying unit 30 specifies the execution solo functions associated with the detected deformation operation. When different execution solo functions are associated with the respective modes of the deformation operation, various solo functions may be executed with a simple operation. Of course, the same execution solo function may be associated with the respective deformation operations. Such an association may be changed by a user, an administrator, or the like.

Figure 11:
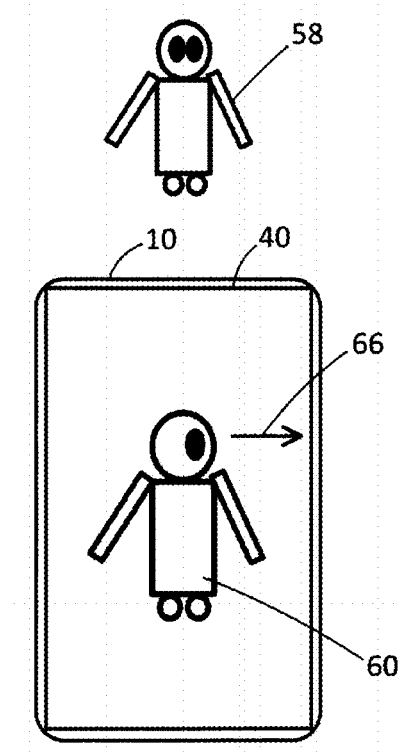
FIG. 11 is a schematic diagram illustrating a device and a terminal device.
Figure 12:
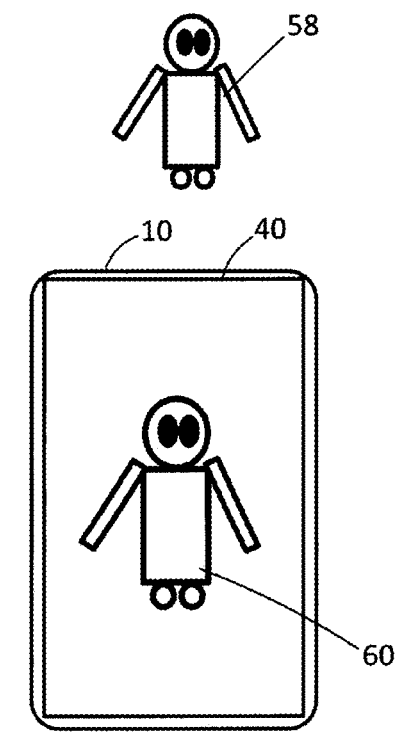
FIG. 12 is a schematic diagram illustrating a device and a terminal device.

When the device image is changed by the user's deformation operation and when the device associated with the device image is not able to be controlled, the controller 28 of the terminal device 10 returns the changed device image to the original device image and displays the original device image. The reason why the control is impossible is not particularly limited, but for example, control is impossible due to a communication error or the like. For example, as illustrated in FIG. 8, when the user bends the flexible display in the direction of the arrow 62 as illustrated in FIG. 8, the controller 28 directs the head image in the device image 60 in the direction of the arrow 66 as illustrated in FIG. 11. When the robot 58 is unable to be controlled by the terminal device 10, the robot 58 does not execute the operation according to the deformation operation. For example, as illustrated in FIG. 11, the robot 58 faces the front without directing the face portion to the direction of the deformation operation. In this case, as illustrated in FIG. 12, the controller 28 returns the changed device image 60 to the original device image 60 so as to cause a flexible display to display the device image 60 in a state where the head image faces forward. In this manner, the device image 60 representing the state of the current external appearance of the robot 58 is displayed.

As another example, the controller 28 causes the robot 58 to execute the execution solo function corresponding to the deformation operation, and upon receiving information indicating that the execution is completed from the robot 58 (receiving feedback from the robot 58), the controller 28 may change the device image 60. In the above example, when the robot 58 directs the face portion in the direction of the arrow 64 (see FIG. 10), information indicating to that effect is transmitted to the terminal device 10. Upon receiving the information, the controller 28 directs the head image in the device image 60 in the direction of the arrow 66 (see FIG. 10).

Example 2

Figure 13:
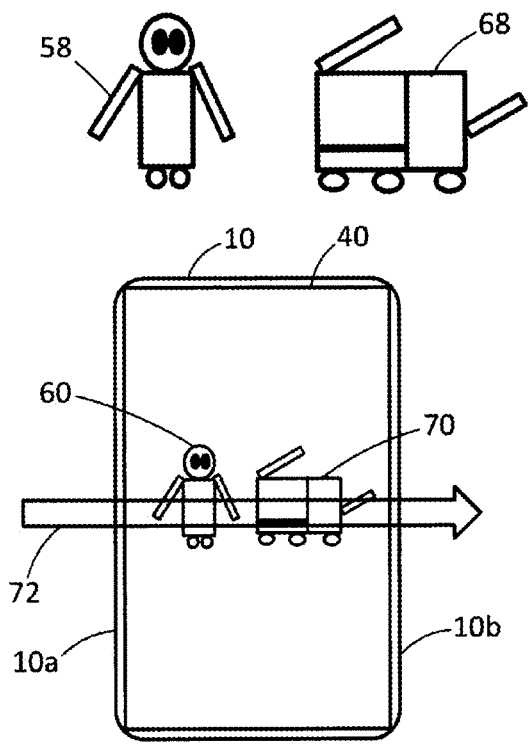
FIG. 13 is a schematic diagram illustrating a device and a terminal device.

Example 2 will be described. In FIG. 13, the robot 58, the multifunction device 68, and the terminal device 10 are illustrated. The robot 58 and the multifunction device 68 are exemplary devices. The robot 58, the multifunction device 68, and the terminal device 10 are devices existing in a real space. The robot 58 and the multifunction device 68 are identified by the specifying unit 30, using the above-mentioned AR technology or other identification technologies.

Device images 60 and 70 are displayed on the front side display 40 of the terminal device 10. The device image 70 is an image associated with the multifunction device 68. The device image 70 may be an image generated by capturing the multifunction device 68, or an image schematically representing the multifunction device 68 (e.g., an icon). The user may operate the UI unit 20 to change the display positions and display sizes of the device images 60 and 70. Character strings indicating the names of the robot 58 and the multifunction device 68 may be displayed along with the device images 60 and 70 or in place of the device images 60 and 70.

In the case where the user performs a deformation operation on the flexible display (the terminal device 10 itself in the example illustrated in FIG. 13) while displaying plural device images (the device images 60 and 70 in the example illustrated in FIG. 13), the specifying unit 30 of the terminal device 10 specifies an execution linkage function associated with the deformation operation among the linkage function group executable using the robot 58 and the multifunction device 68, in the linkage function management table illustrated in FIG. 7. The controller 28 causes the robot 58 and the multifunction device 68 to execute the execution linkage function. When the controller displays information indicating the execution linkage function on the flexible display and the user gives an execution instruction, the controller 28 may cause the robot 58 and the multifunction device 68 to execute the execution linkage function. Further, the controller 28 changes the device images 60 and 70 according to the deformation operation.

For example, it is assumed that the user bends the whole of the left side portion 10a of the flexible display (terminal device 10 itself) toward the right side portion 10b of the flexible display. That is, it is assumed that the user bends the flexible display in the direction of an arrow 72.

The detection unit 24 detects the change (deformation) of the flexible display caused by the above-described bending operation, and specifies the position where the change occurs. The controller 28 specifies the device image displayed at that position. When changes occur at the positions where the device images 60 and 70 are displayed due to the above-described bending operation, the specifying unit 30 identifies the robot 58 associated with the device image 60 and the multifunction device 68 associated with the device image 70 as control targets (objects to be linked) and refers to the linkage function management table illustrated in FIG. 7 to thereby specify the execution linkage function associated with the bending operation among the linkage function group executable using the robot 58 and the multifunction device 68. For example, it is assumed that the execution linkage function is a function (an operation or a process) of having the robot bring paper discharged to the multifunction device.

Figure 14:
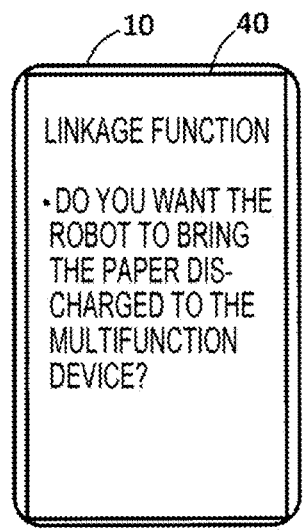
FIG. 14 is a schematic diagram illustrating a terminal device.

As illustrated in FIG. 14, the controller 28 causes the front side display 40 to display information indicating the execution linkage function specified as described above. The controller 28 may output information indicating the execution linkage function as voice information. When the user gives an execution instruction of the execution linkage function, the controller 28 acquires address information of each of the robot 58 and the multifunction device 68, establishes communication with the devices to be linked (the robot 58 and the multifunction device 68) using the respective address information, and transmits control information for causing the robot 58 and the multifunction device 68 to execute the execution linkage function to the robot 58 and the multifunction device 68. The robot 58 and the multifunction device 68 execute the execution linkage function according to the control information. In the case where the above-described bending operation is performed, the controller 28 may cause the robot 58 and the multifunction device 68 to execute the execution linkage function even when the execution instruction is not given by the user.

According to Example 2, when the user deforms the flexible display, the linkage function according to the deformation is notified or executed. Thereby, the linkage function is notified or executed by a simple operation.

The controller 28 may change the linkage function according to the mode of the deformation operation (the mode of change of the flexible display detected by the detection unit 24). For example, the operation of folding the flexible display and the operation of twisting the flexible display are associated with different execution linkage functions, and the specifying unit 30 specifies the execution linkage functions associated with the detected deformation operation. When different execution linkage functions are associated with the respective modes of the deformation operation, various linkage functions may be executed with a simple operation. Of course, the same execution linkage function may be associated with the respective deformation operations. Such an association may be changed by a user, an administrator, or the like.

Figure 15:
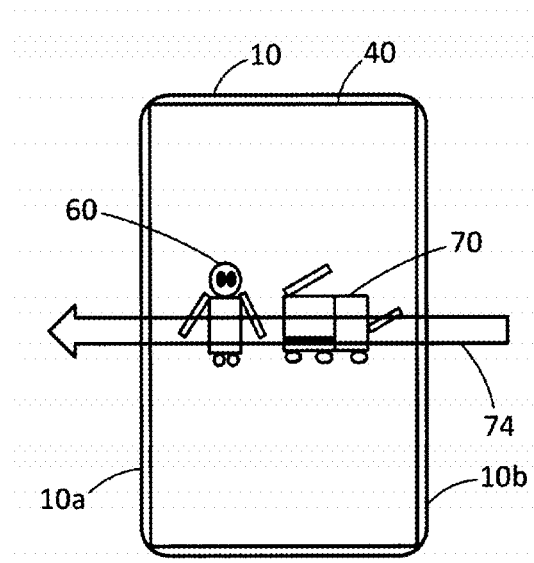
FIG. 15 is a schematic diagram illustrating a terminal device.

For example, the controller 28 may change the linkage function according to the mode of the bending operation (the mode of bending change of the flexible display detected by the detection unit 24). For example, as illustrated in FIG. 15, it is assumed that the user bends the whole of the right side portion 10b of the flexible display toward the left side portion 10a of the flexible display. That is, it is assumed that the user bends the flexible display in the direction of an arrow 74 (the direction opposite to the arrow 72 illustrated in FIG. 13). In this case, the specifying unit 30 specifies an execution linkage function associated with the bending operation. For example, the operation of bending the flexible display in the direction of the arrow 74 is associated with an execution linkage function different from that of the operation of bending the flexible display in the direction of the arrow 72, and the specifying unit 30 specifies the execution linkage function. Thereby, various linkage functions may be executed by changing the direction in which the bending operation is performed. The controller 28 may control the notification of the information indicating the execution linkage function, or may cause the robot 58 and the multifunction device 68 to execute the execution linkage function.

When three or more devices are identified as control targets (objects to be linked) by the deformation operation, an execution linkage function associated with the deformation operation is selected from a linkage function group executable using the three or more devices, and notification or execution of the execution linkage function is controlled.

Example 3

Figure 16:
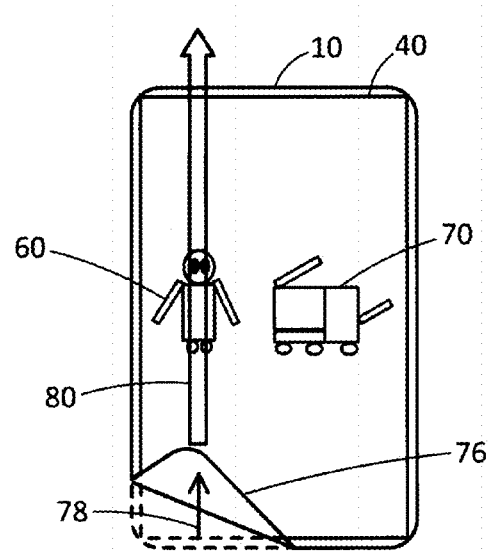
FIG. 16 is a schematic diagram illustrating a terminal device.

Example 3 will be described. FIG. 16 illustrates the terminal device 10. Similarly to Example 2, the robot 58 and the multifunction device 68 are identified, and the device image 60 associated with the robot 58 and the device image 70 associated with the multifunction device 68 are displayed on the front side display 40.

When the user bends an end portion (corner portion) 76 of the flexible display (the terminal device 10 itself) toward the front side display 40 (in the direction indicated by an arrow 78), the controller 28 specifies the device image 60 displayed on an extension line 80 in the direction of the bending operation (the direction indicated by the arrow 78) as the device image associated with the control target. The extension line 80 has a width corresponding to one or plural pixels. The width of the extension line 80 may be set to any value by a user, an administrator, or the like. Further, the controller 28 may specify the device image displayed on the extension line in the direction of the force applied to the flexible display by the bending operation as the device image associated with the control target. In the example illustrated in FIG. 16, since the device image 60 is displayed on the extension line 80, the specifying unit 30 identifies the robot 58 associated with the device image 60 as a control target. Next, by referring to the device function management table illustrated in FIG. 6, the specifying unit 30 specifies the execution solo function associated with the above-described bending operation among the solo function group that the robot 58 has. The controller 28 may control the notification of the execution solo function, or may cause the robot 58 to execute the execution solo function.

Figure 17:
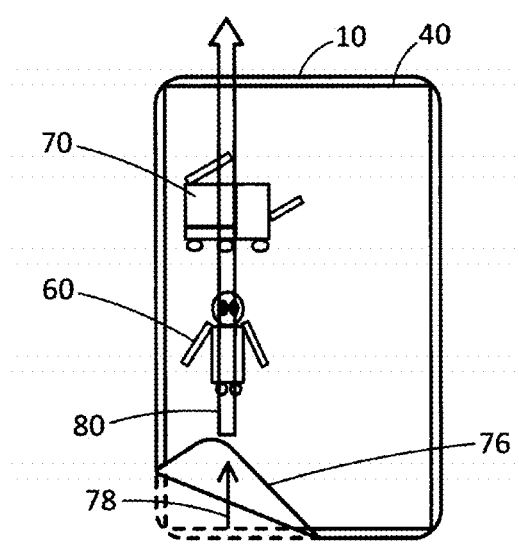
FIG. 17 is a schematic diagram illustrating a terminal device.

Further, as illustrated in FIG. 17, when the device images 60 and 70 are displayed on the extension line 80, the controller 28 specifies the robot 58 associated with the device image 60 and the multifunction device 68 associated with the device image 70 as device images associated with the control targets (objects to be linked). The specifying unit 30 identifies the robot 58 associated with the device image 60 and the multifunction device 68 associated with the device image 70 as the control targets (objects to be linked). Next, by referring to the linkage function management table illustrated in FIG. 7, the specifying unit 30 specifies the execution linkage function associated with the above-described bending operation among the linkage function group executable using the robot 58 and the multifunction device 68. The controller 28 may control the notification of the execution linkage function, or may cause the robot 58 and the multifunction device 68 to execute the execution linkage function.

The user may operate the UI unit 20 to change the display position of the device images 60 and 70 such that the device images 60 and 70 are displayed on the extension line 80. For example, as illustrated in FIG. 17, the user may change the display positions of the device images 60 and 70 such that the device images 60 and 70 are aligned in a straight line, and then bend the end portion 76 in the direction of the arrow 78. Thereby, even if the device images 60 and 70 are not displayed on the extension line 80 before changing the display positions of the device images 60 and 70, the device images 60 and 70 are displayed on the extension line 80. Thus, the robot 58 and the multifunction device 68 are identified as objects to be linked.

According to Example 3, even in a case where plural device images are displayed, when one device image is displayed on the extension line in the operation direction, the device associated with the one device image (a single device) is identified as a control target, and notification or execution of the execution solo function that the device has is controlled. Further, in a case where plural device images are displayed on the extension line in the operation direction, the devices associated with the respective device images are identified as control targets (objects to be linked), and notification or execution of the execution linkage function executable using the plural devices is controlled. Thereby, it is possible to switch between the solo function and the linkage function according to the deformation operation on the flexible display.

Example 4

Example 4 will be described. In Example 4, the controller 28 changes an execution linkage function according to the arrangement order of plural device images. For example, the controller 28 changes the execution linkage function according to the arrangement order of the plural device images displayed in the direction of the operation, starting from a place where an operation is performed on the flexible display. Hereinafter, Example 4 will be described in detail.

FIG. 18 illustrates an exemplary linkage function management table according to Example 4. In the linkage function management table, as an example, information indicating a combination of device IDs, information indicating the names of devices to be linked (e.g., the types of devices), information indicating execution linkage functions (execution linkage function information), information indicating an arrangement order, and information indicating a priority are associated with each other. The device ID and the device name are examples of the device identification information. A linkage function executable using three or more devices may be specified. In this case, a combination of three or more devices and a linkage function are associated with each other, and the association is registered in the linkage function management table.

The arrangement order corresponds to an arrangement order of the device images displayed in the direction of the operation performed on the flexible display.

The priorities are priorities of notification of information on the execution linkage functions (e.g., display or voice output). For example, a combination of PC (A) and multifunction device (B) is associated with a "scan transfer function" and a "print function" as linkage functions. For example, when the respective device images are displayed in the arrangement order of the device image associated with the multifunction device (B) and the device image associated with the PC (A) with respect to the operation direction, the priority of the "scan transfer function" is "1st," and the priority of the "print function" is "2nd." In this case, the information on the "scan transfer function" is notified in preference to (for example, at a higher rank than) the information on the "print function." Conversely, when the respective device images are displayed in the arrangement order of the device image associated with the PC (A) and the device image associated with the multifunction device (B) with respect to the operation direction, the priority of the "print function" is "1st," and the priority of the "scan transfer function" is "2nd." In this case, the information on the "print function" is displayed in preference to (for example, at a higher rank than) the information on the "scan transfer function." Of course, the controller 28 may cause the plural devices to be linked to execute the execution linkage function having "1st" priority, along with notifying the information on the execution linkage function or without notifying the information.

For example, in the example illustrated in FIG. 17, the end portion 76 is a starting point of the operation on the flexible display. On the basis of the position of the starting point, the respective device images are displayed on the extension line 80 in the direction of the operation in the arrangement order of the device images 60 and 70. By referring to the linkage function management table illustrated in FIG. 18, the specifying unit 30 specifies an execution linkage function associated with the device images 60 and 70 arranged in this order (e.g., an execution linkage function A), which is a linkage function executable using the robot 58 and the multifunction device 68, as an execution linkage function having "1st" priority. Further, the specifying unit 30 specifies another execution linkage function (e.g., an execution linkage function B) as an execution linkage function having "2nd" priority. The controller 28 notifies the execution linkage function A in preference to the execution linkage function B (for example, displays the execution linkage function A at a higher rank). The controller 28 may cause the robot 58 and the multifunction device 68 to execute the execution linkage function A.

Figures 19, 20:
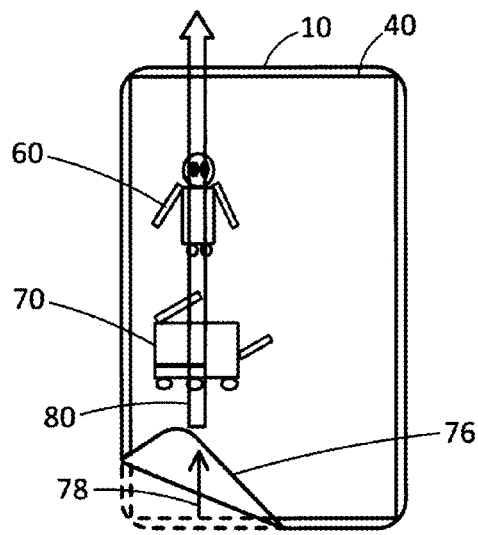
FIG. 19 is a schematic diagram illustrating a terminal device.
FIG. 20 is a diagram illustrating a device function management table according to Example 5.

FIG. 19 illustrates another example. In the example illustrated in FIG. 19, the respective device images are displayed on the extension line 80 in the direction of the operation in the arrangement order of the device images 70 and 60, on the basis of the position of the starting point. By referring to the linkage function management table illustrated in FIG. 18, the specifying unit 30 specifies an execution linkage function associated with the device images 70 and 60 arranged in this order (e.g., the execution linkage function B), which is a linkage function executable using the robot 58 and the multifunction device 68, as an execution linkage function having "1st" priority. Further, the specifying unit 30 specifies another execution linkage function (e.g., the execution linkage function A) as an execution linkage function having "2nd" priority. The controller 28 notifies the execution linkage function B in preference to the execution linkage function A (for example, displays the execution linkage function A at a higher rank). The controller 28 may cause the robot 58 and the multifunction device 68 to execute the execution linkage function B.

The user may operate the UI unit 20 to change the arrangement order of the device images 60 and 70. As a result, even when the same deformation operation is performed, the priorities of the execution linkage functions may be changed.

According to Example 4, the notification order (e.g., display order) of information on the execution linkage functions and execution thereof are changed according to the arrangement order of the device images with respect to the direction of the deformation operation. Thus, notification and execution of various linkage functions may be performed by changing the arrangement order and the direction of the deformation operation.

For example, the arrangement order of the device images may also serve as an order of functions used in each device or an order of movement of data moving between the plural linked devices. Therefore, by changing the notification order and execution of the execution linkage functions according to the arrangement order with respect to the operation direction, the execution linkage function predicted to be used by the user is preferentially notified or executed. That is, the execution linkage function which is more likely to be used by the user is more preferentially notified or displayed. For example, in the case where respective devices are displayed in the arrangement order of the device image associated with multifunction device (B) and the device image associated with the PC (A) on the extension line of the operation direction, it is predicted that the user would use the linkage function of "using the function of the multifunction device (B) prior to the PC (A) and transferring the data from the multifunction device (B) to the PC (A)." Conversely, in the case where respective devices are displayed in the arrangement order of the device image associated with the PC (A) and the device image associated with the multifunction device (B), it is predicted that the user would use the linkage function of "using the function of the PC (A) prior to the multifunction device (B) and transferring the data from the PC (A) to the multifunction device (B)." Therefore, by changing the notification order and execution of the execution linkage functions according to the arrangement order of the device images, the execution linkage function which is more likely to be used by the user is preferentially notified or executed.

Example 5

Example 5 will be described. In Example 5, different solo functions are assigned to respective portions in the device image associated with the device. The specifying unit 30 specifies a solo function executable by using a portion of the device associated with the device image displayed at the changed position on the flexible display. Hereinafter, Example 5 will be described in detail.

FIG. 20 illustrates an exemplary device function management table according to Example 5. In the device function management table, as an example, device IDs, information indicating the names of devices (e.g., the types of devices), information indicating a position (position of a portion) in a device image, information indicating a solo function assigned to the position (position of the portion) in the device image (solo function information), and image IDs are associated with each other. The position in the device image is a specific position (specific portion) in the device image associated with the device. For example, the position in the device image is a specific position in the device image schematically representing the device or a specific position in a device image captured by the camera. Different functions are assigned to respective positions (portions) in the device image.

Figure 21:
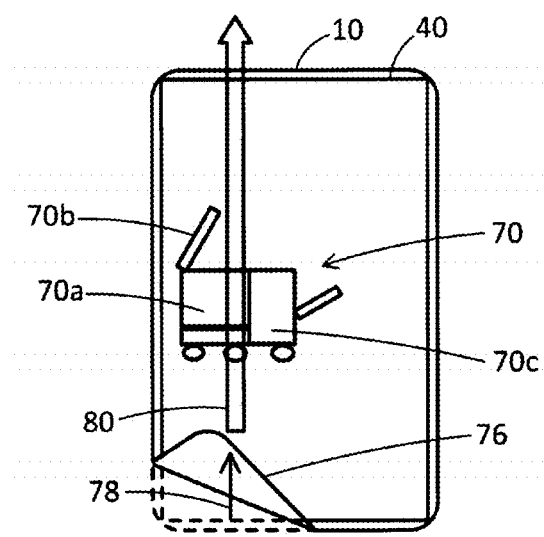
FIG. 21 is a schematic diagram illustrating a terminal device.

Hereinafter, portions of a device will be described with reference to FIG. 21. As illustrated in FIG. 21, the device image 70 associated with the multifunction device 68 is displayed on the flexible display. The multifunction device 68 is identified by using the identification technology (e.g., AR technology) as described above. Further, each portion of the multifunction device 68 is also identified by using the above identification technology. For example, each portion of the device is captured, and each portion is identified using the markerless AR technology.

For example, a "print function" is assigned to a position (portion image 70*a*) associated with a main body portion of the multifunction device 68 in the device image 70. A "scan function" is assigned to a position (portion image 70*b*) associated with a document cover, a document glass, or an automatic document feeder of the multifunction device 68 in the device image 70. A "stapling function" is assigned to a position (portion image 70*c*) associated with a post-processing device in the device image 70. The "stapling function" is a function of stapling the output paper.

The user may separate each portion image from the device image for operation. For example, when the user selects the portion image 70*b* and separates the portion image 70*b* from the device image 70 while the device image 70 is displayed, the controller 28 displays the portion image 70*b* away from the device image 70 on the flexible display. For example, the user may operate a portion image by a drag-and-drop operation. Specifically, the user may select a portion image, separate the portion image from the device image by a drag operation, and perform a drop operation at a target display position, so that the portion image may be displayed at the display position. Of course, even when the operation for separating the portion image from the device image is performed, the portion image may be displayed at the original position.

For example, as illustrated in FIG. 21, the end portion 76 is bent in the direction of the arrow 78, and the portion image 70*a* included in the device image 70 is displayed on the extension line 80 in the direction of the bending operation. By referring to the device function management table illustrated in FIG. 20, the specifying unit 30 specifies a solo function (e.g., a print function) associated with the position of the portion image 70*a* in the device image 70. The controller 28 may notify the print function as the execution solo function or may cause the multifunction device 68 to execute the print function.

In a case where plural portion images (e.g., the portion images 70*a* and 70*b*) are displayed on the extension line 80, the specifying unit 30 refers to the device function management table illustrated in FIG. 20 and specifies solo functions (e.g., the print function and the scan function) associated with the positions of the respective portion images in the device image. The controller 28 may notify the print function and the scan function as the execution solo functions, respectively, or may cause the multifunction device 68 to execute the print function or the scan function. As another example, the specifying unit 30 may specify a linkage function executable using the solo functions associated with the respective portion images, and the controller 28 may notify or execute the linkage function.

According to Example 5, when a device as a control target has plural solo functions, solo functions are individually designated, and the designated solo functions are notified or executed.

The user may operate the UI unit 20 to change the entire display position of the device image or separate the portion image from the device image, thereby displaying the portion image desired by the user on the extension line 80.

Example 6

Example 6 will be described. In Example 6, as in Example 5, different solo functions may be assigned to respective portions in the device image associated with the device. The specifying unit 30 specifies a linkage function executable by using the portion images associated with the respective portion images displayed at the changed positions on the flexible display. Hereinafter, Example 6 will be described in detail.

FIG. 22 illustrates an exemplary device function management table according to Example 6. In the device function management table, as an example, a device ID, information indicating the device name (e.g., the type of the device), a portion ID as portion identification information for identifying the portion, information indicating a solo function assigned to the portion (a solo function that the portion has), and a portion image ID for identifying the portion image associated with the portion are associated with each other. The portion image is an image representing the external appearance of the portion of the device obtained by capturing by the camera. Of course, the portion image that schematically representing a portion of the device may be associated with the portion. For example, different functions are assigned to the respective portions of the device.

To describe with a specific example, a screen display function is assigned to the display unit of the PC (A), and information indicating the screen display function is associated with the portion image ID of the portion image associated with the display unit. The screen display function is a function of displaying information on the PC (A). A data save function is assigned to the main body portion of the PC (A), and information indicating the data save function is associated with the portion image ID of the portion image associated with the main body portion. The data save function is a function of saving (storing) data in the PC (A).

Further, a print function is assigned to the main body portion of the multifunction device (B), and information indicating the print function is associated with the portion image ID of the portion image associated with the main body portion. A scan function is assigned to the reading unit of the multifunction device (B) (e.g., a portion associated with the document cover, the document glass, or the automatic document feeder of the multifunction device (B)), and information indicating the scan function is associated with the portion image ID of the portion image associated with the reading unit. A stapling function is assigned to the post-processing device of the multifunction device (B), and information indicating the stapling function is associated with the portion image ID of the portion image associated with the post-processing device.

A solo function assigned to a portion of a device is specified (identified), for example, by using the markerless AR technology. For example, when a portion of a device is captured by a camera (e.g., the camera 22 of the terminal device 10), the specifying unit 30 specifies (identifies) a solo function associated with the external appearance image data in the device function management table illustrated in FIG. 22. Thereby, the solo function assigned to the captured portion is specified (identified). For example, when the main body portion of the multifunction device (B) is captured by the camera 22, the specifying unit 30 specifies the print function associated with the external appearance image data representing the main body portion of the multifunction device (B) in the device function management table. Thereby, it is specified that the function assigned to the main body portion of the multifunction device (B) is the print function.

Of course, a solo function assigned to a portion of a device may be specified (identified) by using the marker AR technology. For example, a marker such as a two-dimensional barcode in which portion identification information (e.g., a portion ID) for identifying a portion is coded is provided in each portion of the device. When the marker provided in the portion is captured by the camera and the marker AR technology is applied, the portion identification information (e.g., the portion ID) of the portion is acquired. When the portion identification information is thus acquired, the specifying unit 30 specifies (identifies) the solo function associated with the portion identification information (e.g., the portion ID) in the device function management table illustrated in FIG. 22.

FIG. 23 illustrates an exemplary linkage function management table according to Example 6. The linkage function management table is information indicating a linkage function that uses solo functions that plural portions have. In the linkage function management table, as an example, information indicating a combination of portions of devices, information indicating a combination of portion IDs, and information indicating an execution linkage function executable using the solo functions that the plural portions included in the combination have are associated with each other. Of course, in the linkage function management table, information indicating a combination of a portion of a device and an entire device, and information indicating a linkage function using a solo function that the portion of the device has and a solo function that the entire device has may be associated with each other.

To describe with a specific example, a "print function" as a linkage function is assigned to a combination of the display unit of the PC (A) and the main body portion of the multifunction device (B). The "print function" as a linkage function is a function of transmitting data stored in the PC (A) to the multifunction device (B) and printing the data by the multifunction device (B).

Further, a "print function" as a linkage function is assigned to a combination of the main body portion of the multifunction device (B) and the main body portion of a projector (C). The "print function" as a linkage function is a function of transmitting data projected by the projector (C) to the multifunction device (B) and printing the data by the multifunction device (B).

Further, a "scan projection function" as a linkage function is assigned to a combination of the reading unit of the multifunction device (B) and the main body portion of a projector (C). The scan projection function as a linkage function is, for example, a function of transmitting data generated by scanning by the multifunction device (B) to the projector (C) and projecting the data by the projector (C).

The linkage function may be a function executable using solo functions that plural portions included in the same device have or a function executable using solo functions that portions of plural different devices have. Further, the linkage function may be a function executable using solo functions that three or more portions have.

Example 6 will be described with a specific example with reference to FIG. 24. As illustrated in FIG. 24, the device image 70 associated with the multifunction device 68 and a device image 82 associated with the PC (A) are displayed on the flexible display. The multifunction device 68 and the PC (A) are identified by the above identification technology. The device image 82 includes a portion image 82*a* associated with the main body portion of the PC (A) (including a processor such as a CPU, a storage device such as an HDD and an SSD, other boards, etc.) and a portion image 82*b* associated with a display of the PC (A).

For example, the end portion 76 is bent in the direction of the arrow 78, and the portion image 70*a* included in the device image 70 and the portion image 82*b* included in the device image 82 are displayed on the extension line 80 in the direction of the bending operation. By referring to the linkage function management table illustrated in FIG. 23, the specifying unit 30 specifies an execution linkage function associated with the combination of the portion associated with the portion image 70*a* and the portion associated with the portion image 82*b*. The controller 28 may notify the execution linkage function, or may cause the multifunction device 68 and the PC (A) to execute the execution linkage function.

According to Example 6, when a device as a control target has plural solo functions, the plural solo functions are individually designated, and a linkage function using the designated plural solo functions are notified or executed.

The linkage function may be a function that uses a combination of portions of the same device or a combination of portions of different devices, or may be a function that uses a combination of the entire device and a portion of the device.

Further, by combining Examples 4 and 6, the linkage function may be changed according to the arrangement order of the device images or the portion images with respect to the operation direction.

The user may operate the UI unit 20 to change the entire display position of the device image or separate the portion image from the device image, thereby displaying the portion image desired by the user on the extension line 80. As a result, even when the same deformation operation is performed, various linkage functions are notified and executed.

Example 7

Example 7 will be described. In Example 7, the detection unit 24 detects changes in the respective screens of the flexible display. For example, when the flexible display has the front side display 40 as a first screen and the rear side display 42 as a second screen, the detection unit 24 detects respective changes in the front side display 40 and the rear side display 42. When a device as a control target is displayed on the flexible display and when the detection unit 24 detects a valid change with respect to the front side display 40, the specifying unit 30 specifies a solo function associated with the front side of the device. Meanwhile, when the detection unit 24 detects a valid change with respect to the rear side display 42, the specifying unit 30 specifies a solo function associated with the rear side of the device. The controller 28 notifies or executes the solo function specified by the specifying unit 30. For example, when a bending operation of the flexible display is performed toward the front side display 40 side, the detection unit 24 detects a change due to the bending operation as a valid change with respect to the front side display 40. Meanwhile, when a bending operation of the flexible display is performed toward the rear side display 42 side, the detection unit 24 detects a change due to the bending operation as a valid change with respect to the rear side display 42. Hereinafter, Example 7 will be described in detail.

Figure 25:
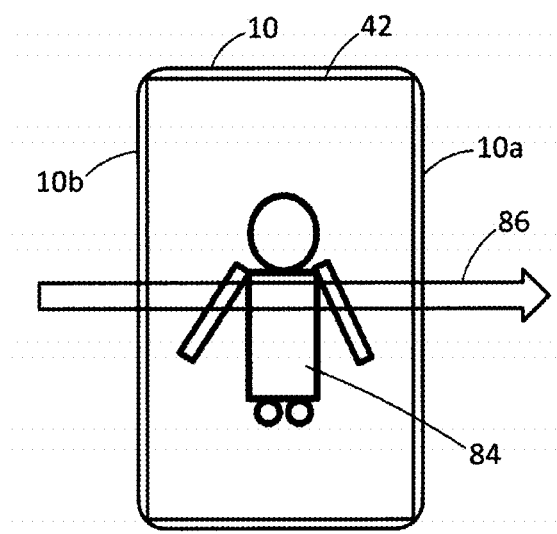
FIG. 25 is a schematic diagram illustrating a terminal device.

FIG. 25 illustrates the rear side display 42 of the flexible display (terminal device 10). A rear side image 84 representing the rear side of the robot 58 as a control target is displayed on the rear side display 42. As illustrated in FIG. 8, a front side image (an image displayed as the device image 60) representing the front side of the robot 58 is displayed on the front side display 40.

For example, as illustrated in FIG. 8, when the user bends the entire left side portion 10a of the flexible display (the terminal device 10 itself) to the front side display 40 side toward the right side portion 10b of the flexible display, the detection unit 24 detects a change in the flexible display due to the bending operation as a valid change with respect to the front side display 40. In this case, the specifying unit 30 specifies the solo function associated with the front side of the robot 58 displayed on the front side display 40. That is, the same or different solo functions are assigned to the front side and rear side of the robot 58, respectively, and the information indicating the assignment is stored in the terminal device 10, the server 16, or the like as the device function management information. By referring to the device function management information, the specifying unit 30 specifies the solo function associated with the front side. For example, the solo function is a function that the front side portion of the robot 58 has.

Meanwhile, as illustrated in FIG. 25, when the user bends the entire right side portion 10b of the flexible display to the rear side display 42 side toward the left side portion 10a of the flexible display (in a case of bending in the direction of the arrow 86), the detection unit 24 detects a change in the flexible display due to the bending operation as a valid change with respect to the rear side display 42. In this case, by referring to the above-described device management information, the specifying unit 30 specifies the solo function associated with the rear side of the robot 58 displayed on the rear side display 42. For example, the solo function is a function that the rear side portion of the robot 58 has.

The controller 28 notifies or executes the solo function specified by the specifying unit 30.

According to Example 7, various functions according to the deformation operation on the flexible display having the plural display units are notified or executed.

Further, Example 7 may be applied to specifying the linkage function. For example, when the flexible display is bent toward the front side display 40, the specifying unit 30 specifies a linkage function executable using solo functions that portions of devices displayed on the front side display 40 have (e.g., solo functions that the front side portions have). Further, when the flexible display is bent toward the rear side display 42, the specifying unit 30 specifies a linkage function executable using solo functions that portions of devices displayed on the rear side display 42 have (e.g., solo functions that the rear side portions have).

Further, by combining Examples 4 and 7, the linkage function may be changed according to the arrangement order of the device images.

(Connection Process During Linkage)

Figure 26:
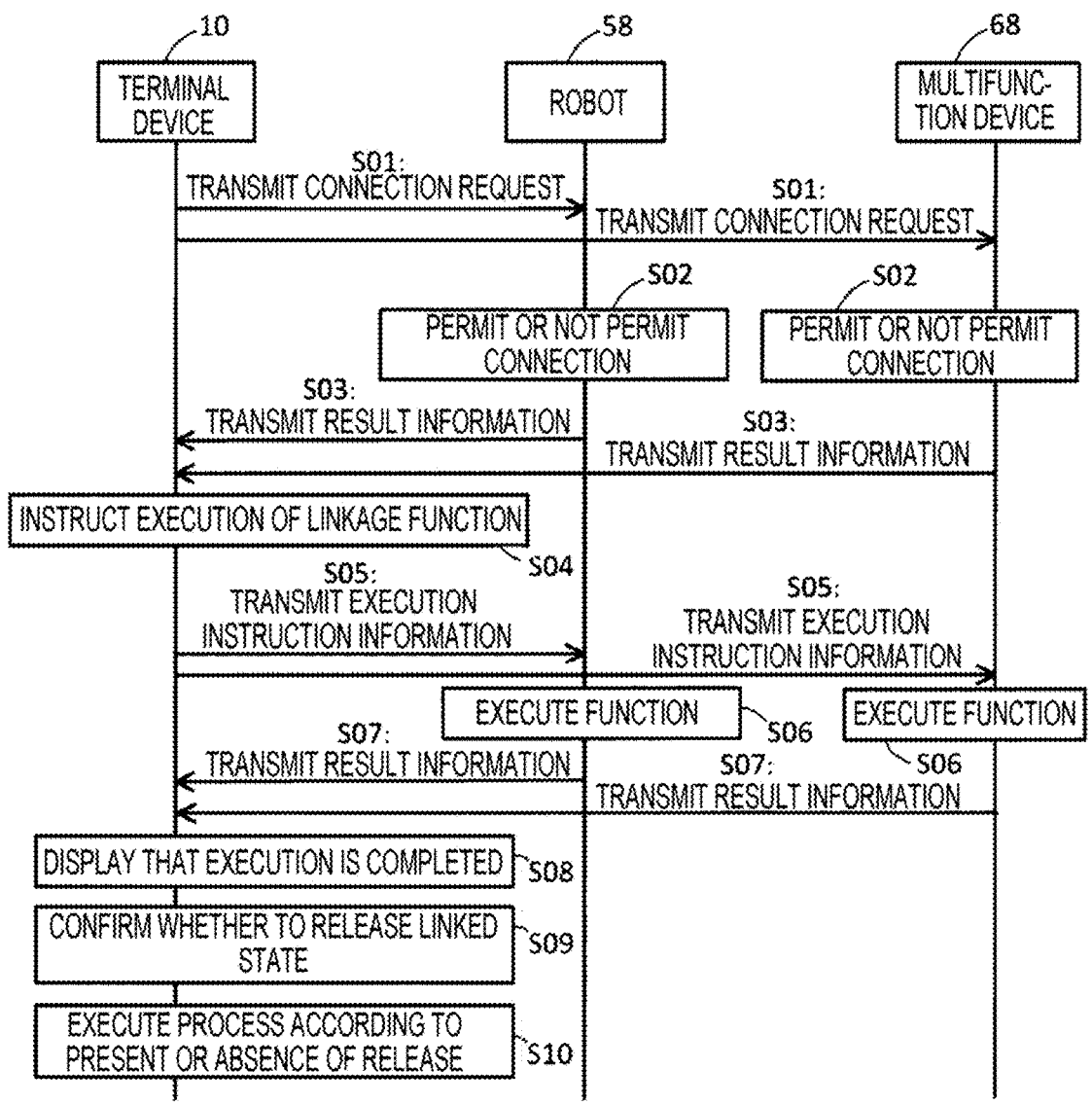
FIG. 26 is a sequence diagram illustrating an operation of the information processing system.

Here, an operation when executing a linkage function will be described. For example, when a linkage function is executed, a connection request is transmitted from the terminal device 10 to each device to be linked, and communication is established between the terminal device 10 and each device. Hereinafter, the connection process will be described with reference to FIG. 26. FIG. 26 is a sequence diagram illustrating the process.

When the robot 58 and the multifunction device 68 are identified as devices to be linked, the terminal device 10 transmits information indicating the connection request to the devices to be linked (the robot 58 and the multifunction device 68) (S01). For example, when address information indicating the address of each of the devices to be linked is stored in the server 16, the terminal device 10 acquires the address information of each of the devices to be linked from the server 16. In a case where the address information is included in the device identification information, the controller 28 of the terminal device 10 acquires the address information from the device identification information of each device. Of course, the address information of each device may be stored in the storage unit 26 of the terminal device 10. The terminal device 10 transmits the information indicating the connection request to each of the devices to be linked (e.g., the robot 58 and the multifunction device 68) by using the address information of each of the devices to be linked.

The robot 58 and the multifunction device 68 that receive the information indicating the connection request determine whether to permit the connection with the terminal device 10 (S02). For example, when the robot 58 and the multifunction device 68 are devices that are not permitted to connect, or when the number of devices requesting connection exceeds the upper limit, connection is not permitted. When the connection from the terminal device 10 is permitted, in order to prevent that setting information unique to each of the robot 58 and the multifunction device 68 is not changed from the terminal device 10, the changing operation may be prohibited. For example, it may be prohibited to change the color parameters of the multifunction device 68, the setting time when shifting to power saving, and the like. Thereby, the security for the device to be linked is improved. As another example, when linking devices, change of setting information may be restricted as compared with a case where the devices are used alone without being linked. For example, it may be permitted to change the smaller number of setting items as compared with the case where the device is used alone. In addition, browsing of other users' personal information such as the operation history may be prohibited. As a result, the security for the user's personal information is improved.

Result information indicating permission or non-permission of the connection is transmitted from the robot 58 and the multifunction device 68 to the terminal device 10 (S03). When the connection to the robot 58 and the multifunction device 68 is permitted, communication is established between the terminal device 10 and the robot 58, and further communication is established between the terminal device 10 and the multifunction device 68.

Next, in the terminal device 10, the user instructs execution of a linkage function (S04). The terminal device 10 transmits information indicating the execution instruction of the linkage function (execution instruction information) to each of the devices to be linked (the robot 58 and the multifunction device 68) according to the instruction (S05). The execution instruction information transmitted to the robot 58 includes information indicating a process to be executed by the robot 58, and the execution instruction information transmitted to the multifunction device 68 includes information indicating a process to be executed by the multifunction device 68.

When receiving the execution instruction information, the robot 58 and the multifunction device 68 execute the linkage function according to the execution instruction information (S06). When the linkage function to be executed includes a process of transmitting and receiving data between the robot 58 and the multifunction device 68, communication is established between the robot 58 and the multifunction device 68. For example, the execution instruction information transmitted to the robot 58 includes the address information of the multifunction device 68, and the execution instruction information transmitted to the multifunction device 68 includes the address information of the robot 58. Communication is established between the robot 58 and the multifunction device 68 using the address information. After the communication is established, the robot 58 and the multifunction device 68 execute the linkage function while transmitting and receiving data to and from each other.

When the execution of the linkage function is completed, information indicating completion of execution of the linkage function is transmitted from the robot 58 and the multifunction device 68 to the terminal device 10 (S07). Information indicating that execution of the linkage function is completed is displayed on the UI unit 20 of the terminal device 10 (S08). When information indicating completion of execution is not displayed even though a preset time elapses since the execution instruction is given, the controller 28 of the terminal device 10 may cause the UI unit 20 to display information indicating an error, and again transmit the execution instruction information or the information indicating the connection request to the robot 58 and the multifunction device 68.

Next, the user confirms whether or not to release the linked state between the robot 58 and the multifunction device 68 (S09), and a process is executed according to the presence or absence of the release (S10). When releasing the linked state, the user gives an instruction of release by using the terminal device 10. Therefore, the communication between the terminal device 10 and the robot 58 is released, and further the communication between the terminal device 10 and the multifunction device 68 is released. Similarly, the communication between the robot 58 and the multifunction device 68 is released as well. When the linked state is not to be released, the execution instruction may be given continuously.

Further, the number of devices to be linked may be increased. For example, a third device may be designated as an object to be linked by a deformation operation, and the three devices including the robot 58 and the multifunction device 68 may be linked. Information indicating that the robot 58 and the multifunction device 68 are already identified as objects to be linked is stored in the terminal device 10 or the server 16.

The device identification information indicating the device to be linked and the linkage function information indicating the executed linkage function may be stored in the terminal device 10 or the server 16. For example, user account information (an example of user identification information) of the user who uses the terminal device 10 may be acquired, and history information indicating an association among the user account information, the device identification information indicating the devices to be linked, and the linkage function information indicating the executed linkage function may be created and stored in the terminal device 10 or the server 16. The history information may be created by the terminal device 10 or may be created by the server 16. By referring to the history information, it is specified what linkage function is executed using what device group.

The devices to be linked (e.g., the robot 58 and the multifunction device 68) may store the user account information of the user who requests the connection and the terminal identification information indicating the terminal device 10 of the connection request source as the history information. The user using the device is specified by referring to this history information. For example, the user may be specified by utilizing the history information in the case of identifying the user who uses the device when the device is broken or in the case of performing the charging process on the expendable item. The history information may be stored in the terminal device 10 or the server 16 or may be stored in another device.

The user account information is stored, for example, in the storage unit 26 of the terminal device 10 in advance, and the controller 28 of the terminal device 10 functions as an example of a user identification unit, reads the user account information of the user from the storage unit 26, and identifies the user who uses the terminal device 10. When the user account information of plural users is stored in the storage unit 26, the user designates his/her own user account information using the terminal device 10. As a result, the user account information of the user is read and the user is identified. As another example, the controller 28 of the terminal device 10 may identify the user by reading the user account information of the user logged in to the terminal device 10. As still another example, when only one user account information is stored in the same terminal device 10, the controller 28 of the terminal device 10 may identify the user by reading the user account information. When the user account is not set and the user account information is not created, the initial setting is performed, so that the user account information is created.

The use history of the cooperative function may be managed for each user, and information indicating the linkage function used in the past by the user indicated by the read user account information may be displayed on the UI unit 20 of the terminal device 10. The information indicating the use history may be stored in the terminal device 10 or may be stored in the server 16. In addition, information indicating a linkage function used at a frequency equal to or higher than a preset use frequency may be displayed. The time and effort of the user's operation related to the linkage function is reduced by providing such a shortcut function.

Further, when the linkage function associated with a combination of plural devices designated by the deformation operation is not registered in the linkage function management table, the specifying unit 30 determines that no usable linkage function is registered. In this case, the controller 28 causes the display unit of the UI unit 20 to display information indicating that no usable linkage function is registered. Even in such a case, the linkage function may be usable depending on the update status of the device or the like. In this case, the specifying unit 30 specifies the linkage function that becomes usable.

Second Exemplary Embodiment

Hereinafter, an information processing system according to a second exemplary embodiment will be described. In the first exemplary embodiment, the control target is a device, but in the second exemplary embodiment, the control target is a function. For example, when a function image associated with a device is displayed on the flexible display and when a deformation operation is performed on the flexible display, a function associated with the function image displayed at the changed position is identified as a control target. When one function image is displayed at the changed position, a solo function associated with the function image is identified as a control target. When plural function images are displayed, solo functions associated with the respective function image are identified as control targets (objects to be linked).

The function image may be, for example, an image associated with software (an application, etc.) or an image associated with a device which performs a process (a device present in the real space). The function image is, for example, an image such as an icon, which may be regarded as a virtual image in the sense of distinguishing from an image representing an actual external appearance of a device as hardware (e.g., a photograph) and an image representing the device itself.

Hereinafter, specific examples of the second exemplary embodiment will be described in detail.

Example 8

Figures 27, 28:
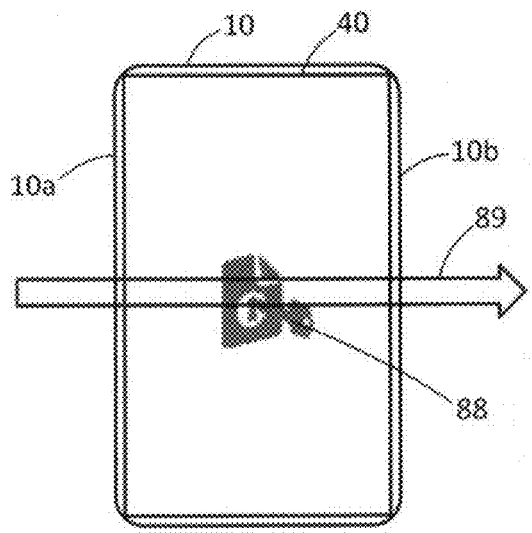
FIG. 27 is a schematic diagram illustrating a terminal device.
FIG. 28 is a diagram illustrating a linkage function management table according to Example 9.

Example 8 will be described. FIG. 27 illustrates the terminal device 10. A function image 88 is displayed on the front side display 40 of the terminal device 10. The function image 88 is an image associated with a password setting function (e.g., an image associated with password setting software). When the user selects the function image 88 and gives an instruction to activate the password setting function, for example, the password setting software is activated, and the password setting process is performed on data or the like. Further, information indicating the name of the function may be displayed. For example, the character string "password setting function" may be displayed together with the function image 88. Of course, the function image 88 may not be displayed, but the character string may be displayed. The software associated with the function image may be installed in the terminal device 10 or may be stored in an external device such as the server 16, and the function by the software may be provided from the external device to the terminal device 10. The user may operate the UI unit 20 to change the display position and display size of the function image 88.

For example, it is assumed that the user bends the whole of the left side portion 10a of the flexible display (terminal device 10 itself) toward the right side portion 10b of the flexible display. That is, it is assumed that the user bends the flexible display in the direction of an arrow 89 illustrated in FIG. 27.

The detection unit 24 detects the change (deformation) of the flexible display due to the above-described bending operation, specifies the position where the change occurs, and the controller 28 specifies the function image displayed at that position. When a change occurs at the position where the function image 88 is displayed due to the above-described bending operation, the specifying unit 30 identifies the password setting function associated with the function image 88 as a control target. When a character string indicating a function is displayed in place of the function image, the controller 28 may specify the character string displayed at the changed position, and the specifying unit 30 may identify a function associated with the character string (e.g., the password setting function) as a control target. The controller 28 may notify the user of the status that the password setting function is designated (display information indicating the status or output the status as voice), or may execute the password setting function. Further, the controller 28 may change the function image 88. For example, the controller 28 may change the function image 88 to an image representing the designated state, or may change the function image 88 to an image representing a state where the password setting function is being executed.

Similarly to Example 1 described above, the execution solo function may be assigned to each deformation operation. In this case, the specifying unit 30 specifies an execution solo function associated with the bending operation, and the controller 28 notifies or executes the execution solo function. Further, the controller 28 may change the execution solo function according to the mode of the deformation operation.

According to Example 8, when the user deforms the flexible display, the function associated with the function image displayed at the changed position is notified or executed. Thereby, the function is notified or executed by a simple operation.

Further, similarly to Example 3, the specifying unit 30 may identify the function associated with the function image displayed on the extension line in the direction of the deformation operation as a control target, and the controller 28 may notify or execute the function.

Further, the same or different functions may be assigned to each portion in the function image. In this case, the portion displayed at the changed position of the flexible display is identified, and the function assigned to that portion is notified or executed.

Example 9

Example 9 will be described. FIG. 28 illustrates an exemplary linkage function management table according to Example 9. The linkage function management table is information indicating linkage functions executable using plural solo functions. In the linkage function management table, as an example, function IDs (e.g., IDs for identifying software), information indicating the function names (e.g., the name of software), information indicating linkage functions executable using plural solo functions, deformation operation information indicating the deformation operation performed on the flexible display, and execution linkage function information indicating a linkage function to be executed when the deformation operation is performed, among a linkage function group executable using plural solo functions to be linked are associated with each other. A linkage function executable using plural solo functions is specified by referring to the linkage function management table.

For example, software a as a function is software that transmits data, and software 13 as a function is software that sets a password for data with a password. For example, a linkage function of setting a password to data and then transmitting the data is implemented by combining the software a and the software (3. For other software, an executable linkage function is similarly specified. A linkage function executable using three or more solo functions (e.g., software) may be specified. In this case, a combination of three or more solo functions and a linkage function are associated with each other, and the association is registered in the linkage function management table.

A combination of the plural solo functions is associated with one or more deformation operations, and the respective deformation operations are associated with the same or different execution linkage functions.

Figures 29, 30:
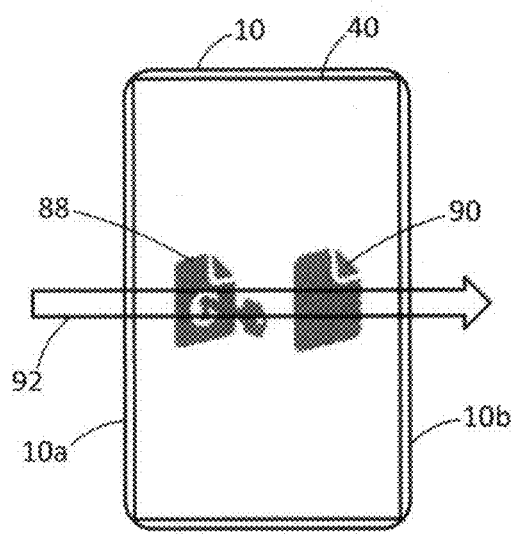
FIG. 29 is a schematic diagram illustrating a terminal device.
FIG. 30 is a diagram illustrating a linkage function management table according to Example 10.

Hereinafter, Example 9 will be described in detail with reference to FIG. 29. FIG. 29 illustrates the terminal device 10. Function images 88 and 90 are displayed on the front side display 40 of the terminal device 10. The function image 90 is an image associated with a data transmission function (e.g., an image associated with data transmission software). When the user selects the function image 90 and gives an instruction to activate the data transmission function, for example, the data transmission software is activated, and data to be transmitted and the like are transmitted to a transmission destination. The user may operate the UI unit 20 to change the display positions and display sizes of the function images 88 and 90. Information indicating the names of the password setting function and the data transmission function (e.g., character strings) may be displayed along with the function images 88 and 90 or in place of the function images 88 and 90.

For example, it is assumed that the user bends the whole of the left side portion 10*a* of the flexible display (terminal device 10 itself) toward the right side portion 10*b* of the flexible display. That is, it is assumed that the user bends the flexible display in the direction of an arrow 92.

The detection unit 24 detects the change (deformation) of the flexible display due to the above-described bending operation, specifies the position where the change occurs, and the controller 28 specifies the function image displayed at that position. When changes occur at the positions where the function images 88 and 90 are displayed due to the above-described bending operation, the specifying unit 30 identifies the password setting function associated with the function image 88 and the data transmission function associated with the function image 90 as control targets (objects to be linked) and refers to the linkage function management table illustrated in FIG. 28 to specify the execution linkage function associated with the deformation operation among the linkage function group executable using the password setting function (password setting software) and the data transmission function (data transmission software). For example, it is assumed that the execution linkage function is a function of setting a password to data to be processed and transmitting the data to a destination.

For example, the controller 28 causes the flexible display to display information indicating the execution linkage function specified as described above. The controller 28 may output information indicating the execution linkage function as voice information. When the user gives an instruction to execute the execution linkage function, the controller 28 activates the password setting software to set the password for the data to be processed, and further activates the data transmission software to transmit the data to the destination. In the case where the above-described bending operation is performed, the controller 28 may execute the execution linkage function even when the execution instruction is not given by the user. Further, the controller 28 may change the function images 88 and 90.

According to Example 9, when the user deforms the flexible display, the linkage function according to the deformation is notified or executed. Thereby, the linkage function is notified or executed by a simple operation.

Further, similarly to Example 3, the specifying unit 30 may identify functions associated with the respective function images displayed on the extension line in the direction of the deformation operation as objects to be linked (control targets), and specify an execution linkage function associated with the deformation operation among the linkage function group executable using the plural functions. The controller 28 notifies or executes the execution linkage function. The controller 28 may change the linkage function according to the mode of the deformation operation.

Further, Example 4 may be applied to Example 9. That is, the linkage function may be changed according to the arrangement order of the plural function images with respect to the operation direction. Further, the same or different functions may be assigned to each portion in the function image.

Third Exemplary Embodiment

Hereinafter, an information processing system according to a third exemplary embodiment will be described. In the third exemplary embodiment, the control targets are a device and a function. For example, when a device image associated with a device and a function image associated with a function are displayed on the flexible display and when a deformation operation is performed on the flexible display, a device associated with the device image and a function associated with the function image displayed at the changed position are identified as objects to be linked (control targets). Then, the execution linkage function associated with the deformation operation is specified among the linkage function group executable using the device and the function, and the execution linkage function is notified or executed.

Hereinafter, specific examples of the third exemplary embodiment will be described in detail.

Example 10

Example 10 will be described. FIG. 30 illustrates an exemplary linkage function management table according to Example 10. The linkage function management table is information indicating linkage functions executable using devices and functions (e.g., software). In the linkage function management table, as an example, a combination of IDs (a combination of a device ID and a function ID), information indicating a device name and a function name, linkage function information indicating linkage functions executable using a device and a function, deformation operation information indicating a deformation operation performed on the flexible display, and execution linkage function information indicating a linkage function to be executed when the deformation operation is performed among a linkage function group executable using the device and the function which are to be linked are associated with each other. The linkage function executable using the device and the function is specified by referring to the linkage function management table. For example, a linkage function of transmitting data using the PC (A) is implemented by combining, for example, the PC (A) as a device A with the data transmission function as a function a. For other devices and functions, executable linkage functions are similarly specified. A linkage function executable using three or more devices and functions may be specified. In this case, a combination of three or more devices and functions and a linkage function are associated with each other, and the association is registered in the linkage function management table.

A combination of the device and the function is associated with one or plural deformation operations, and the respective deformation operations are associated with the same or different execution linkage functions.

Figure 31:
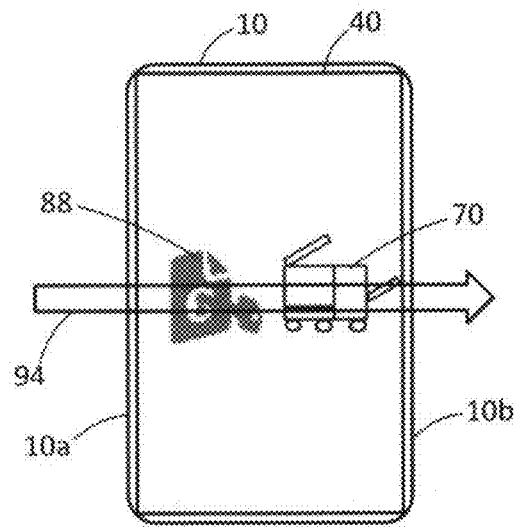
FIG. 31 is a schematic diagram illustrating a terminal device.

Hereinafter, Example 10 will be described in detail with reference to FIG. 31. FIG. 31 illustrates the terminal device 10. The device image 70 and the function image 88 are displayed on the front side display 40 of the terminal device 10.

For example, it is assumed that the user bends the whole of the left side portion 10*a* of the flexible display (terminal device 10 itself) toward the right side portion 10*b* of the flexible display. That is, it is assumed that the user bends the flexible display in the direction of an arrow 94.

The detection unit 24 detects the change (deformation) of the flexible display due to the above-described bending operation, specifies positions where the change occurs, and the controller 28 specifies the device image and the function image displayed at that positions. When changes occur at the positions where the device image 70 and the function image 88 are displayed due to the above-described bending operation, the specifying unit 30 identifies the multifunction device 68 associated with the device image 70 and the password setting function associated with the function image 88 as control targets (objects to be linked) and refers to the linkage function management table illustrated in FIG. 30 to specify the execution linkage function associated with the deformation operation among the linkage function group executable using the multifunction device and the password setting function. For example, it is assumed that the execution linkage function is a function of setting a password for data generated by scanning by the multifunction device 68.

For example, the controller 28 causes the flexible display to display information indicating the execution linkage function specified as described above. The controller 28 may output information indicating the execution linkage function as voice information. When the user gives an instruction to execute the execution linkage function, the controller 28 outputs control information to the multifunction device 68 to thereby control scanning by the multifunction device 68 and transfer of data generated by the scanning to the terminal device 10. As a result, the multifunction device 68 executes scanning, and data generated by the scanning is transferred from the multifunction device 68 to the terminal device 10. Further, the controller 28 activates the password setting software and sets a password for the data. In the case where the above-described bending operation is performed, the controller 28 may execute the execution linkage function even when the execution instruction is not given by the user. Further, the controller 28 may change the device image 70 and the function image 88.

According to Example 10, when the user deforms the flexible display, the linkage function according to the deformation is notified or executed. Thereby, the linkage function is notified or executed by a simple operation.

Further, similarly to Example 3, the specifying unit 30 may identify a device and a function which are respectively associated with the device image and the function image which are displayed on the extension line in the direction of the deformation operation, as objects to be linked (control targets), and specify an execution linkage function associated with the deformation operation among the linkage function group executable using the device and the function. The controller 28 notifies or executes the execution linkage function. The controller 28 may change the linkage function according to the mode of the deformation operation.

Further, Example 4 may be applied to Example 10. That is, the linkage function may be changed according to the arrangement order of the device image and the function image with respect to the operation direction. Further, the same or different functions may be assigned to respective portions in the device image, or the same or different functions may be assigned to respective portions in the functional image.

Fourth Exemplary Embodiment

Hereinafter, an information processing system according to a fourth exemplary embodiment will be described. In the fourth exemplary embodiment, the control target is a file. For example, when a file image associated with a file is displayed on the flexible display and when a deformation operation is performed on the flexible display, a file associated with the file image displayed at the changed position is identified as a control target. For example, each file is associated with software (e.g., application software) for executing a process on the file. When one file image is displayed at the changed position, a file associated with the file image is identified as a control target. When plural file images are displayed, respective files associated with the file images are identified as the control targets (objects to be linked). The file image may be, for example, a schematic image (e.g., an icon or the like), or an image such as a photograph.

Hereinafter, specific examples of the fourth exemplary embodiment will be described.

Example 11

Figure 32:
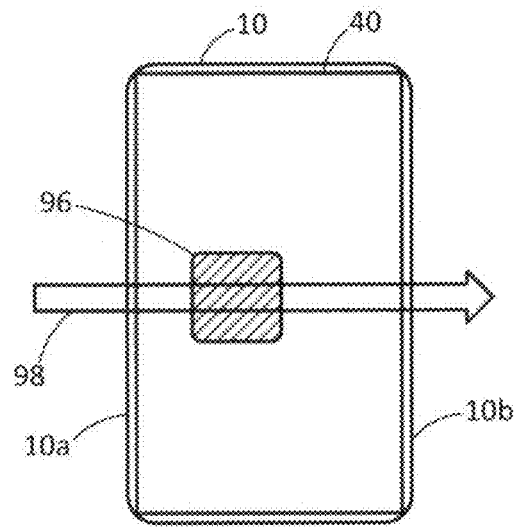
FIG. 32 is a schematic diagram illustrating a terminal device.

Example 11 will be described. FIG. 32 illustrates the terminal device 10. A file image 96 is displayed on the front side display 40 of the terminal device 10. The file image 96 is, for example, an image associated with a document file A. Further, a character string indicating the name of the document file A may be displayed along with the file image 96 or in place of the file image 96. The user may operate the UI unit 20 to change the display position and display size of the file image 96.

For example, it is assumed that the user bends the whole of the left side portion 10*a* of the flexible display (terminal device 10 itself) toward the right side portion 10*b* of the flexible display. That is, it is assumed that the user bends the flexible display in the direction of an arrow 98 illustrated in FIG. 32.

The detection unit 24 detects the change (deformation) of the flexible display caused by the above-described bending operation, and specifies the position where the change occurs, and the controller 28 specifies the file image displayed at that position. When a change occurs at the position where the file image 96 is displayed due to the above-described bending operation, the specifying unit 30 identifies the document file A associated with the file image 96 as a control target. The controller 28 may notify the user of a status that software (e.g., document editing software) associated with the document file A is designated, or may activate the software to display the content of the document file A (the document itself) on the display unit of the UI unit 20. Further, the controller 28 may change the file image 96. For example, the controller 28 may change the file image 96 to an image representing a designated state, or may change the file image 96 to an image representing a state where the content of the document file A (the document itself) is displayed.

Similarly to Example 1 described above, the execution solo function (e.g., software) may be assigned to each deformation operation. In this case, the specifying unit 30 specifies an execution solo function associated with the bending operation, and the controller 28 notifies or executes the execution solo function. Further, the controller 28 may change the execution solo function according to the mode of the deformation operation.

According to Example 11, when the user deforms the flexible display, the file associated with the file image displayed at the changed position is identified as a control target, and a function associated with the file is notified or executed. Thereby, the function is notified or executed by a simple operation.

Further, similarly to Example 3, the specifying unit 30 may identify the file associated with the file image displayed on the extension line in the direction of the deformation operation as a control target, and the controller 28 may notify or execute a function associated with the file.

Example 12

Example 12 will be described. In Example 12, plural files are identified as objects to be linked (control targets), and the linkage functions are notified or executed. The linkage function management information according to Example 12 is information for managing linkage functions executed by linking plural functions to each other. The linkage function is, for example, a function implemented by linking plural software to each other. Of course, the linkage function may be a function implemented by linking a function that a device as hardware has and a function implemented by software, or by linking plural devices.

Hereinafter, the linkage function according to Example 12 will be described in more detail. The linkage function is a function to be executed with respect to plural files (data) when the plural files are identified as objects to be linked (control targets). For example, each file is associated with software (application software) for executing a process on the file. The linkage function is a function implemented by linking applications which are associated with the plural files, respectively.

Examples of the file include a document file, an image file, a video file, a spreadsheet file, a presentation file, a graphic (drawing) file, and an audio file.

The document file is a file having a document format. Also, the document file is a file configured with character strings and other pieces of information. The document file may include images, tables, or graphics as other pieces of information. The document format is, for example, a text format or a document format. For example, data having a text format (e.g., data appended with a character string ".txt" as an extension) and data having a document format (e.g., data appended with a character string ".doc" or ".docx" as an extension) fall into the document files.

The image file is a file having image formation (an image format). The image file may be image data having a raster format or image data having a vector format. The image format is, for example, a JPEG format, a BMP (bitmap) format, a PDF format, a GIF format, a TIFF format, a PNG format or a PICT format. For example, data having a JPEG format (data appended with a character string ".jpeg" as an extension), data having a BMP format (data appended with a character string ".bmp" as an extension), data having a PDF format (data appended with a character string ".pdf" as an extension), data having a GIF format (data appended with a character string ".gif" as an extension), data having a TIFF format (data appended with a character string ".tiff" as an extension), data having a PNG format (data appended with a character string ".png" as an extension), and data having a PICT format (data appended with a character string ".pict" as an extension) fall into the image files. Of course, image data having a format other than these formats may be used as an image file.

The video file is a file having a video format. The video format is, for example, an AVI format, an MP4 format, an MOV format, an MPEG2-TS format, an MPEG2-PS format, a WMV format, or an FLV format. For example, data having an AVI format (data appended with a character string ".avi" as an extension), data having an MP4 format (data appended with a character string ".mp4" as an extension), data having an MOV format (data appended with a character string ".mov" as an extension), data having an MPEG2-TS format (data appended with a character string ".m2ts" as an extension), data having an MPEG2-PS format (data appended with a character string ".mpeg" as an extension), data having a WMV format (data appended with a character string ".wmv" as an extension), and data having an FLV format (data appended with a character string ".flv") fall into the video files. Of course, video data having a format other than these formats may be used as a video file.

The spreadsheet file is a file having a table format. Also, the spreadsheet file is a file configured with tables, graphs, or other pieces of information. The spreadsheet file may include character strings, images, or graphics as other pieces of information. For example, the spreadsheet file is data appended with a character string ".csv," ".xls" or ".xlsx" as an extension.

The presentation file is a file having a presentation sheet format. For example, data appended with a character string ".ppt" or ".pptx" as an extension falls into the presentation file. The presentation file is configured with, for example, character strings, images (still images or moving images), graphics, and voice.

The graphic file is a file having a graphic (drawing) format. The graphic file is created by, for example, graphic generating software (e.g., two-dimensional CAD or three-dimensional CAD). For example, the graphic file is data having a DXF format (data appended with a character string ".dxf" as an extension) or data having a DWG format (data appended with a character string ".dwg" as an extension). In addition, data appended with a character string ".vsd" or ".vsdx" as an extension may be treated as the graphic file.

The audio file is a file having an audio format. The audio format is, for example, an uncompressed audio format (e.g., a WAV format, an AIFF format, or a BWF format), a lossy compressed audio format (e.g., an mp3 format, an AAC format, or a WMA format), or a lossless compressed audio format (e.g., a TAK format or an FLAC format). Data having an uncompressed audio format (data appended with, for example, a character string ".wav" as an extension), data having a lossy compressed audio format (data appended with, for example, a character string ".mp3" as extension), and data having an uncompressed audio format (data appended with, for example, a character string ".tak" as an extension) fall into the audio files.

Hereinafter, the linkage function management table according to Example 12 will be described with reference to FIG. 33. FIG. 33 illustrates an exemplary linkage function management table according to Example 12. In the linkage function management table, as an example, information indicating a combination of plural file formats, information indicating linkage functions (linkage function information), deformation operation information indicating the deformation operation performed on the flexible display, and execution linkage function information indicating a linkage function to be executed when the deformation operation is performed, among a linkage function group executable using a combination of the plural file formats are associated with each other. A linkage function associated with a combination of plural file formats is specified by referring to the linkage function management table.

In Example 12, the linkage function is defined for each file format (attribute). The file format is, for example, the above-described document format, image format, video format, table format, sheet format, graphic format, or audio format.

The linkage function may be a function implemented by linking plural different functions (e.g., different pieces of software) to each other or a function implemented by linking identical functions (e.g., identical software) to each other. For example, when a document creation function (document creation software) and an image display function (image display software (e.g., an image viewer)) are linked to each other, a function of inserting (attaching) an image into a document or a function of superimposing a document (a character string or a text) on an image is implemented as a linkage function. That is, an image insertion function or a text superimposition function is implemented by linking the document creation function and the image display function to each other.

The linkage function managed by the linkage function management table may be a function executable by software installed in the terminal device 10, a function executable by software installed in an external device such as the server 16, or a function executable by software installed in the terminal device 10 and software installed in an external device.

As another example of the linkage function management information, information indicating a combination of plural functions (plural pieces of software), information indicating a linkage function executable by linking the plural functions (linkage function information), the deformation operation information, and the execution linkage function information may be associated with each other.

Hereinafter, each linkage function illustrated in FIG. 33 will be described.

In FIG. 33, the "document format" is a text format (with an extension of ".txt") or a document format (with an extension of ".doc" or ".docx"). The "table format" is a format with an extension expressed as ".csv," ".xls" or the like. The "image format" is a format with an extension expressed as ".jpeg," ".pdf" or the like. The "video format" is a format with an extension expressed as, for example, ".avi," ".mpeg" or the like. The "sheet format" is a format with an extension expressed as ".ppt" or the like. While FIG. 33 does not illustrate the graphic format and the audio format, association between a combination including the graphic format and the audio format and a linkage function may be registered in the linkage function management table. Of course, an association between a combination including file formats other than the file formats illustrated in FIG. 33 and a linkage function may be defined and registered in the linkage function management table.

Each linkage function will be described in more detail. When a document file A and a spreadsheet file B are identified as files to be linked (control targets), a "function of inserting a table into a document" and a "function of inserting a document into a table" which are associated with a combination of the document format and the table format are specified as linkage functions. The "function of inserting a table into a document" is a function of inserting the table represented by the spreadsheet file B into the document represented by the document file A. The "function of inserting a document into a table" is a function of inserting the document represented by the document file A into the table represented by the spreadsheet file B.

When a document file A and an image file C are identified as files to be linked, a "function of inserting an image into a document" and a "function of superimposing a document on an image" which are associated with a combination of the document format and the image format are specified as linkage functions. The "function of inserting an image into a document" is a function of inserting the image represented by the image file C into the document represented by the document file A. The "function of superimposing a document on an image" is a function of superimposing the document represented by the document file A on the image represented by the image file C.

When a document file A and a video file D are identified as files to be linked, a "function of inserting a video into a document" and a "function of inserting a still image into a document" which are associated with a combination of the document format and the video format are specified as linkage functions. The "function of inserting a video into a document" is a function of inserting the video represented by the video file D into the document represented by the document file A. The "function of inserting a still image into a document" is a function of inserting one or plural frames (still images) constituting the video file D into the document represented by the document file A. For example, when the document file A is a document file which is not compatible with a video, that is, a file into which a video cannot be inserted and when the "function of inserting a still image into a document" is executed, one or plural frames (still images) included in the video file D are inserted into the document represented by the document file A. Further, a "function of inserting a document into a video" may be used as a linkage function.

Plural files having the same file format may be identified as files to be linked. For example, when document files A1 and A2 are identified as files to be linked, a "function of integrating documents" which is associated with the combination of the document format and the document format is specified as a linkage function. The "function of integrating documents" is a function of integrating the documents represented by the document files A1 and A2 with each other (e.g., combining the two documents with each other) to generate a new document file A3 while saving or removing the document files A1 and A2.

When spreadsheet files B1 and B2 are identified as files to be linked, a "function of integrating tables" which is associated with the combination of the table format and the table format is specified as a linkage function. The "function of integrating tables" is a function of integrating the tables represented by the spreadsheet files B1 and B2 with each other (e.g., combining the two tables with each other) to generate a new spreadsheet file B3 while saving or removing the spreadsheet files B1 and B2.

When video files D1 and D2 are identified as files to be linked, a "function of integrating videos" which is associated with the combination of the video format and the video format is specified as a linkage function. The "function of integrating videos" is a function of integrating the videos represented by the video files D1 and D2 with each other (e.g., combining the two videos with each other) to generate a new video file D3 while saving or removing the video files D1 and D2.

In addition, when a presentation file E and the document file A are identified as files to be linked, a "function of inserting a document into a presentation sheet" which is associated with the combination of the sheet format and the document format is specified as a linkage function. The "function of inserting a document into a presentation sheet" is a function of inserting the document represented by the document file A into the presentation sheet represented by the presentation file E.

Figure 34:
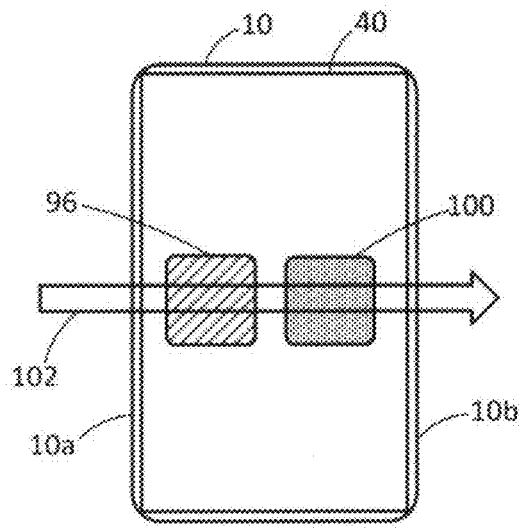
FIG. 34 is a schematic diagram illustrating a terminal device.

Hereinafter, Example 12 will be described in detail with reference to FIG. 34. FIG. 34 illustrates the terminal device 10. File images 96 and 100 are displayed on the front side display 40 of the terminal device 10. The file image 100 is, for example, an image associated with the image file C. The user may operate the UI unit 20 to change the display positions and display sizes of the file images 96 and 100. Further, information indicating file names (for example, character strings) may be displayed along with the file images 96 and 100 or in place of the file images 96 and 100.

For example, it is assumed that the user bends the whole of the left side portion 10a of the flexible display (terminal device 10 itself) toward the right side portion 10b of the flexible display. That is, it is assumed that the user bends the flexible display in the direction of an arrow 102.

The detection unit 24 detects the change (deformation) of the flexible display caused by the above-described bending operation, and specifies the position where the change occurs, and the controller 28 specifies the file image displayed at that position. When changes occur at the positions where the file images 96 and 100 are displayed due to the above-described bending operation, the specifying unit 30 identifies the document file A associated with the file image 96 and the image file C associated with the file image 100 as control targets (objects to be linked). More specifically, the specifying unit 30 identifies the file format of the document file A based on the extension of the document file A (e.g., the extension associated with the document file A as the attribute information of the document file A). Similarly, the specifying unit 30 identifies the file format of the image file C based on the extension of the image file C (e.g., the extension associated with the image file C as the attribute information of the image file C). The extension may be included in the file name. When the extension of the document file A is the extension representing a document format such as ".txt" or ".docx," the specifying unit 30 identifies that the file format of the document file A is a document format. When the extension of the image file C is the extension representing an image format such as ".jpeg," the specifying unit 30 identifies that the file format of the image file A is an image format. Then, by referring to the linkage function management table illustrated in FIG. 33, the specifying unit 30 specifies the execution linkage function associated with the deformation operation among the linkage function group associated with the combination of the document format and the image format. For example, it is assumed that the execution linkage function is a function of "inserting an image into a document."

For example, the controller 28 causes the flexible display to display information indicating the execution linkage function specified as described above. The controller 28 may output information indicating the execution linkage function as voice information. When the user gives an instruction to execute the execution linkage function, the controller 28 inserts the image represented by the image file C into the document represented by the document file A.

More specifically, the controller 28 activates a document application and an image application. The document application is software (program) having a function of generating, editing, and displaying a file having a document format. The image application is software (program) having a function of generating, editing, and displaying a file having an image format. The document application may be associated with the document file A in advance, and the image application may be associated with the image file C in advance. The controller 28 uses the functions that the image application has to copy an image from the image file C and uses the function that the document application has to paste the image in the document represented by the document file A. As a result, a document into which an image is inserted is generated. The controller 28 may use the functions that the image application has to extract a portion image representing a specific portion from the image represented by the image file C and paste the portion image into the document. An area to which the image is pasted in the document may be a predetermined area, an area designated by the user, or an area presumed that a character string related to the image is described. For example, the controller 28 presumes or searches a character string expressing a feature portion represented in the image, and presumes, in the document, that an area in which a character string having the same or similar meaning as such a character string is described is an area in which a character string related to the image is described. Of course, the area may be presumed by another method.

Further, the controller 28 may change the file images 96 and 100.

The controller 28 may generate a new file by executing the linkage function. In this case, plural files themselves identified as objects to be linked are not edited. For example, when the document file A and the image file C are identified as files to be linked and an execution instruction of the "function of inserting an image into a document" is given, the controller 28 generates a new document file AC by pasting the image represented by the image file C into the document represented by the document file A. In this case, the controller 28 generates a new file image (e.g., an icon) associated with the document file AC, and causes the flexible display to display the file image. In this case, the document file A and the image file C themselves are not edited.

As another example, the controller 28 may edit (including processing or the like) the files themselves identified as objects to be linked without generating a new file by executing the linkage function. In the above example, the controller 28 pastes the image represented by the image file C into the document represented by the document file A, and saves the document file in which pasting of the image as the document file A is reflected. In this case, the document file A is updated.

According to Example 12, when the user deforms the flexible display, the linkage function according to the deformation is notified or executed. Thereby, the linkage function is notified or executed by a simple operation.

Further, similarly to Example 3, the specifying unit 30 may identify the files associated with the respective file images displayed on the extension line in the direction of the deformation operation as objects to be linked (control targets), and specify an execution linkage function associated with the deformation operation among the linkage function group associated with the combination of the formats of the plural files. The controller 28 notifies or executes the execution linkage function. The controller 28 may change the linkage function according to the mode of the deformation operation.

Further, Example 4 may be applied to Example 12. That is, the linkage function may be changed according to the arrangement order of the plural file images with respect to the operation direction.

In Example 12, notification of the information on the linkage function and the linkage function to be executed may be changed according to a master-servant relationship between the files. For example, a file whose content itself represented by the file is editable is a master file, and a file whose content itself is not editable is a servant file. As an example, when the document itself represented in the document file is editable, the document file is the master file. Further, when it is impossible to edit the image itself represented in the image file (that is, when it is possible to superimpose content on the image but it is impossible to edit the image itself), the image file is the servant file. The same applies to other files. Of course, even for document files, a document file whose document is not editable is a servant file. Even for image files, an image file whose image is editable is a master file.

The specifying unit 30 may determine whether the file is either the master file or the servant file based on the format (i.e., the extension) of the identified file. For example, the specifying unit 30 determines that a file having a document format, a file having a table format, a file having a sheet format, and a file having a graphic format are master files, and that a file having an image format, a file having a video format, and a file having am audio format are the servant files. Of course, the determination as to whether the file is either a master file or a servant file may not be made unequivocally based on the file format, but the determination as to whether the file is either a master file or a servant file may be made by individually determining the file identified as the object to be linked. For example, even when a file has an image format, the file may be a master file so long as the image is editable.

For example, when the document file A and the image file C are identified as objects to be linked, the specifying unit 30 determines whether the document file A is either a master file or a servant file based on the extension associated with the document file A, and determines whether the image file C is either a master file or a servant file based on the extension associated with the image file C. It is assumed that the extension of the document file A is, for example, ".docx," and that the extension of the image file C is, for example, ".jpeg." In this case, since the document file A has the document format and is a file that is editable, the specifying unit 30 determines that the document file A is the master file. Further, since the image file C has the image format and is a file that is not editable, the specifying unit 30 determines that the image file C is the servant file. Of course, the specifying unit 30 may determine whether the document file A and the image file C are editable files, by determining the document file A and the image file C individually without making a determination based on the extension.

Since the document file A is the master file and the image file C is the servant file, the image represented in the image file C is the content to be pasted, and the document represented by the document file A is the content to which the image is pasted. In this case, the specifying unit 30 specifies the "function of inserting an image into a document" as an execution linkage function.

Further, among the plural linkage functions registered in the linkage function management table illustrated in FIG. 33, the controller 28 may notify the information on the linkage function, which is specified based on the master-servant relationship of the files, in preference to the information on the other linkage functions. Descriptions will be made on the document file A and the image file C by way of an example. As a linkage function associated with a combination of a document format and an image format, a "function of inserting an image into a document" and a "function of superimposing a document on an image" are registered in the linkage function management table (see FIG. 33). In this case, the specifying unit 30 specifies the "function of inserting an image into a document" which is specified based on the master-servant relationship of the files as a linkage function having "1st" priority and specifies the "the function of superimposing a document on an image" as a linkage function having "2nd" priority. According to the priorities, the controller 28 notifies the information on the "function of inserting an image into a document" in preference to (e.g., at a higher rank than) the information on the "function of superimposing a document on an image."

Further, when plural linkage functions are specified based on the master-servant relationship of the files, the controller 28 may determine the priority of each linkage function based on the use history of each linkage function by the user, and notify the information on each linkage function according to the priority of each linkage function. For example, the controller 28 notifies the information on the linkage function with high frequency of use preferentially (e.g., at a higher rank).

Further, when plural linkage functions are specified based on the master-servant relationship of the files, the controller 28 may determine the priorities of the linkage functions based on the relationship between plural files identified as objects to be linked (i.e., the relationship between plural file formats), and notify the information on the respective linkage functions according to the priorities of the linkage functions. For example, the controller 28 determines the possibility that each linkage function included in the plural linkage functions specified by the specifying unit 30, based on the plural file formats. For example, the controller 28 notifies the information on the linkage function with a higher use possibility preferentially (e.g., at a higher rank). For example, in the combination of the document format and the image format, it is expected that the "function of inserting an image into a document" is more likely to be used than the "function of superimposing a document on an image." In this case, the controller 28 notifies the information on the "function of inserting an image into a document" in preference to the information on the "function of superimposing a document on an image."

The combinations of objects to be linked is not limited to the combinations in the first to fourth exemplary embodiments. For example, when a combination of at least two of devices, functions (including functions executed by devices and functions executed by software), files, or software is identified as objects to be linked, notification or execution of a linkage function executable using the combination may be controlled. For example, when a device and a file are identified as objects to be linked as a result of the deformation operation on the flexible display, the specifying unit 30 specifies a linkage function executable using the device and the file, and the controller 28 notifies or executes the linkage function. As a specific example, when a multifunction device and a document file are identified as objects to be linked, the specifying unit 30 specifies linkage functions executable using the multifunction device and the document file (e.g., a function of printing the document file by the multifunction device, a function of facsimile transmission of the document file by the multifunction device, etc.). The controller 28 notifies or executes the linkage functions. Similarly, when a function and a file are identified as objects to be linked, the specifying unit 30 specifies a linkage function executable using the function and the file, and the controller 28 notifies or executes the linkage function. As a specific example, when a document application and a document file are identified as objects to be linked, the specifying unit 30 specifies a linkage function executable using the document application and the document file (e.g., a function of editing or outputting the document file by the document application, etc.). Further, when a device, a function, and a file are identified as objects to be linked, the specifying unit 30 specifies a linkage function executable using the device, the function (e.g., software), and the file, and the controller 28 notifies or executes the linkage function. As a specific example, when a multifunction device, a document application, and a document file are identified as objects to be linked, the specifying unit 30 specifies a linkage function executable using the multifunction device, the document application, and the document file (e.g., a function of editing the document file by a document application, outputting the document to the multifunction device, and printing and facsimile transmission of the document file by the multifunction device, etc.). The combinations in the above-described specific examples are merely illustrative, and linkage functions executable by combining devices, functions, files, and software other than those described above may be defined.

Further, in the first to fourth exemplary embodiments, when the same deformation operation is successively performed on the flexible display (e.g., when the same deformation operation is performed twice within a predetermined time), the controller 28 may cancel the notification or execution of a solo function or a linkage function specified by the first deformation operation. That is, when the same deformation operation is performed successively, notification or execution of the solo function or the linkage function is canceled. In this manner, it is possible to cancel the notification or execution of the functions by a simple operation.

Further, the detection unit 24 may detect the deformation operation on a specific portion of the flexible display as an invalid operation. For example, a portion assumed to be gripped by the user to hold the flexible display is the specific portion. By providing such a specific portion, when the user grips the specific portion to hold the flexible display, the gripped portion is not detected as a portion subjected to the deformation operation, so that the operation not intended by the user is not performed. The specific portion may be determined in advance or may be set by the user.

Further, the specifying unit 30 may identify a control target according to a deformation operation, and the controller 28 may cause the display unit of the UI unit 20 to display a function selection screen allowing a user to select a solo function or a linkage function executable using the control target. When the user selects the solo function or the linkage function on the function selection screen and gives an execution instruction, the controller 28 controls the execution of the function selected by the user.

Further, when a deformation operation is performed on the flexible display for a predetermined time or longer, the detection unit 24 may detect the deformation operation as a valid operation. In addition, the detection unit 24 may detect a deformation operation performed for a time less than the predetermined time as an invalid operation. Thus, an action not intended by the user is not performed. The above-mentioned predetermined time may be changed by the user.

Further, the detection unit 24 may determine whether the deformation operation is valid or invalid based on the magnitude of a force applied to the flexible display per unit time, or may determine whether the deformation operation is valid or invalid based on a pressure applied to the flexible display.

Fifth Exemplary Embodiment

Hereinafter, a flexible display according to a fifth exemplary embodiment will be described. In the fifth exemplary embodiment, the detection unit 24 detects a change in the flexible display from a reference position, and the controller 28 controls a process according to the change amount and changes the reference position. Hereinafter, the fifth exemplary embodiment will be described in detail.

Figure 35:
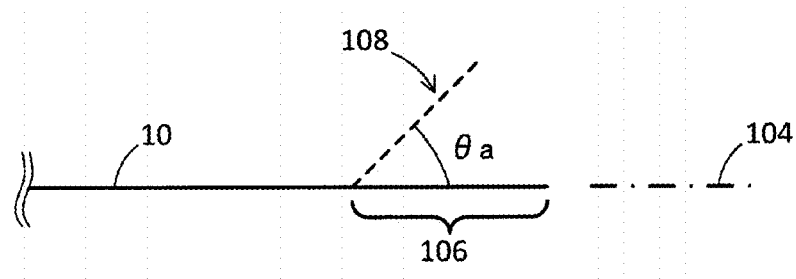
FIG. 35 is a schematic diagram illustrating a state where the flexible display is viewed from the lateral side.

FIG. 35 schematically illustrates a state where the flexible display (the terminal device 10 itself in the example illustrated in FIG. 35) is seen from the lateral side. A reference position 104 is a position when the flexible display is not bent (default position). When the user bends a portion 106 of the flexible display to a position of a broken line portion 108, the detection unit 24 detects a bending amount. For example, the detection unit 24 detects an angle θa between the reference position 104 and the position of the broken line portion 108 as a bending amount. The controller 28 controls notification and execution of a process according to the bending amount.

For example, the bending amount and a function are associated with each other, and information indicating the association is stored in the terminal device 10, the server 16, or the like. The specifying unit 30 specifies a function associated with the bending amount (e.g., the angle θa) detected by the detection unit 24, and the controller 28 controls notification and execution of the specified function. The function may be a function executed by a device, a function executed by software, a solo function executed by a single control target (a device or software), or a linkage function executed by one or plural control targets.

Further, when the bending amount is detected by the detection unit 24 while application software is activated, the controller 28 may cause the application software to execute a process according to the bending amount. For example, with respect to the same application software, a process executed by the application software is associated with each bending amount, and the specifying unit 30 specifies a process associated with the bending amount detected by the detection unit 24. The controller 28 controls notification and execution of the specified process.

For example, the controller 28 changes the reference position according to a predetermined change condition. The change condition is, for example, a condition related to a timing of changing the reference position. Specifically, the controller 28 changes the reference position based on the change amount at a time at which the flexible display starts to display. The time at which it is started to display is, for example, a timing at which the power supply of the flexible display is turned on, a timing at which the flexible display resumes from the sleep state or the pause state to the operating state (i.e., a timing at which restriction on the power consumption is canceled), or the like. Further, the controller 28 may change the reference position when the flexible display does not change for a predetermined time or more.

For example, the detection unit 24 detects a bending position of the flexible display when the power supply of the flexible display is turned on, and the controller 28 uses the detected position as a reference position. When the bending position is not detected, the controller 28 uses the default reference position 104. Meanwhile, when the portion 106 is bent to the position of the broken line portion 108 and the bending position (the position of the broken line portion 108) is detected when the power supply is turned on, the controller 28 uses the position of the broken line portion 108 (the position of the angle θa) as a new reference position. The same is true when the flexible display resumes from the sleep state or the pause state. That is, the detection unit 24 detects the bending position of the flexible display when the flexible display resumes from the sleep state or the pause state to the operating state, and the controller 28 uses the detected position as a reference position. When the bending position is not detected, the controller 28 uses the default reference position 104.

Further, when the portion 106 is bent to the position of the broken line portion 108 and the bending state is kept for a predetermined time or more and detected by the detection unit 24, the controller 28 may use the position of the broken line portion 108 as a new reference position.

When a new reference position is determined, the controller 28 controls notification and execution of a process according to the bending amount from the new reference position.

Figure 36:
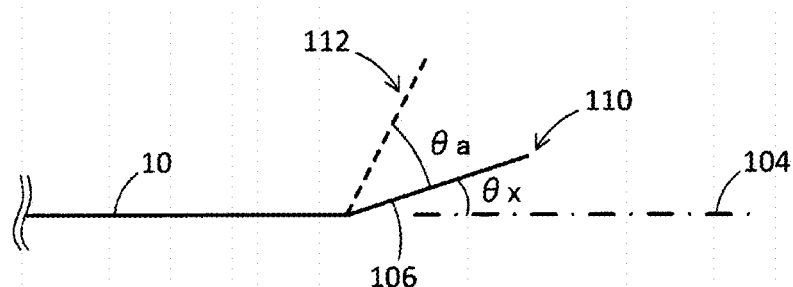
FIG. 36 is a schematic diagram illustrating a state where the flexible display is viewed from the lateral side.

Hereinafter, a process of changing the reference position will be described in detail with reference to FIG. 36. FIG. 36 schematically illustrates a state where the flexible display (the terminal device 10 itself in the example illustrated in FIG. 36) is seen from the lateral side. For example, the portion 106 of the flexible display is bent to a position of a solid line portion 110. The angle between the original reference position 104 and the solid line portion 110 is an angle θx. When the change condition is satisfied, the controller 28 changes the reference position from the original reference position 104 to the position of the solid line portion 110. That is, the controller 28 uses the position of the solid line portion 110 as a new reference position. When the portion 106 is bent from the new reference position (the position of the solid line portion 110) to a position of a broken line portion 112 (a position at which an angle with the new reference position is an angle θa), the specifying unit 30 specifies a process associated with the bending amount (angle θa), and the controller 28 controls notification or execution of the process. Therefore, the process according to the bending amount is appropriately executed. In this regard, detailed descriptions will be made with reference to FIGS. 36 and 37.

Figure 37:
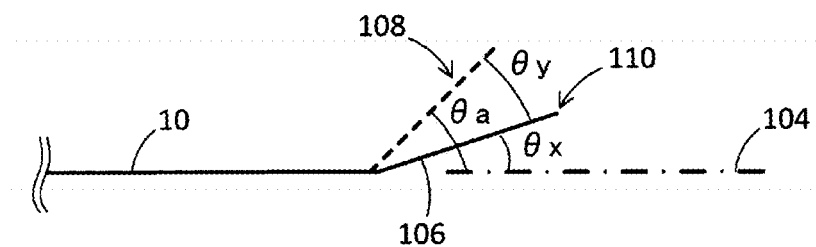
FIG. 37 is a schematic diagram illustrating a state where the flexible display is viewed from the lateral side.

FIG. 37 schematically illustrates a state where the flexible display (the terminal device 10 itself in the example illustrated in FIG. 37) is seen from the lateral side. Consideration will be made on, for example, a case where the portion 106 is bent to the position of the solid line portion 110 and its state is kept, and the portion 106 is bent from such a position to a broken line portion 108. A position of the broken line portion 108 is a position where the portion 106 is bent from the original reference position 104 by the angle θa. When the original reference position 104 is used as the reference position and the portion 106 is bent from the solid line portion 110 to the broken line portion 108, the detection unit 24 detects the angle θa as the bending amount. Although the angle between the solid line portion 110 and the broken line portion 108 is an angle θy<θa) and the actual bending amount is the angle θy, the angle θa is detected as the bending amount, so that a process associated with the angle θa is notified or executed. To the contrary, in the case where the solid line portion 110 is used as the reference position, even when the portion 106 is bent from the solid line portion 110 to the broken line portion 108, the bending amount (angle θy) is detected and the bending amount (angle θa) is not detected. When the portion 106 is bent to the broken line portion 112 as illustrated in FIG. 36, the bending amount (angle θa) is detected and a process associated with the angle θa is notified or executed. Thereby, it is possible to prevent the occurrence of the operation not intended by the user.

Hereinafter, the operation according to the fifth exemplary embodiment will be described. First, the controller 28 detects the current state of the flexible display (e.g., the state of the power supply (ON, OFF, sleep, pause, etc.), application software during activation, etc.). Next, the detection unit 24 detects the current bending position of the flexible display. For example, when the portion 106 is bent to the position of the solid line portion 110 as illustrated in FIG. 36, the detection unit 24 detects such a bending position. In a case where the flexible display is a slide type display, the detection unit 24 may detect the position of the display when the flexible display is developed in a sliding manner. Next, the controller 28 sets a reference position of the deformation operation. When the flexible display is not bent as illustrated in FIG. 35, the controller 28 sets the default reference position 104 as a reference position. When the portion 106 is bent to the position of the solid line portion 110 as illustrated in FIG. 36, the controller 28 sets the position of the solid line portion 110 as a reference position. Further, when the application software is activated, the controller 28 identifies the activated application software. Next, when a deformation operation (e.g., a bending operation) is performed on the flexible display, the detection unit 24 detects the bending amount from the reference position set as described above. The specifying unit 30 specifies a process according to the bending amount, and the controller 28 notifies or executes the specified process.

According to the fifth exemplary embodiment, it is possible to perform a control based on a change from the reference position to which the change of the flexible display as a display is reflected. Thereby, it is possible to prevent, for example, the occurrence of the operation not intended by the user. For example, in a case where the flexible display has a bending trace, a case where the flexible display may be kept in a bent state by using a gear or the like, or a case where a material capable of keeping the flexible display in the bent state is used, when a process according to the bending amount from the default reference position is notified or executed, the process unintended by the user may be notified or executed. According to the fifth exemplary embodiment, even though the flexible display is in such a state, a process according to the bending amount from a new reference position is notified or executed. Thus, it is possible to prevent the occurrence of the above problem.

For example, it is assumed that specific application software is executed when a portion of the flexible display is bent by 60 degrees. In this case, when a portion of the flexible display is already bent by 30 degrees from the default reference position, the specific application software will be executed merely by bending the portion by further 30 degrees. Since the user intends that the specific application software is executed when the flexible display is bent by 60 degrees, the above operation is contrary to the user's intention. To the contrary, according to the fifth exemplary embodiment, the position where the flexible display is bent by 30 degrees from the default reference position is defined as a new reference position. Therefore, even when the flexible display is further bent by 30 degrees from the new reference position, the specific application is not executed. The specific application software is executed when the flexible display is further bent by 60 degrees from the new reference position. Therefore, an operation consistent with the intention of the user is implemented.

Modification 1

Hereinafter, Modification 1 of the fifth exemplary embodiment will be described with reference to FIG. 37. In Modification 1, a user selects either a reference position before change (e.g., the reference position 104) or a reference position after change (e.g., the position of the solid line portion 110), and the controller 28 controls a process according to the change amount from the reference position selected by the user. Information indicating the reference position before change (past reference position) is stored in the terminal device 10.

For example, as illustrated in FIG. 37, it is assumed that the portion 106 is already bent to the position of the solid line portion 110. When the reference position after change is selected, as in the above example, the controller 28 uses the position of the solid line portion 110 as a reference position, the specifying unit 30 specifies a process according to the bending amount from the position of the solid line portion 110, and the controller 28 notifies or executes the specified process. For example, when the portion 106 is bent to the position of the broken line portion 112 (the position of the angle θa) as illustrated in FIG. 36, the controller 28 notifies or executes the process associated with the angle θa.

Meanwhile, when the reference position before change is selected, the controller 28 uses the default reference position 104 as a reference position, the specifying unit 30 specifies a process according to the bending amount from the reference position 104, and the controller 28 notifies or executes the specified process. For example, when the portion 106 is bent from the position of the solid line portion 110 to the position of the broken line portion 108 (the position of the angle θy with respect to the position of the solid line portion 110 as a reference and the position of the angle θa with respect to the reference position 104 as a reference) as illustrated in FIG. 37, the controller 28 notifies or executes a process according to the bending amount (angle θa) from the reference position 104 to the position of the broken line portion 108.

According to Modification 1, when the reference position before change is selected, the process may be notified or executed with less bending amount as compared with the case where the reference position after change is selected.

Modification 2

Figure 38:
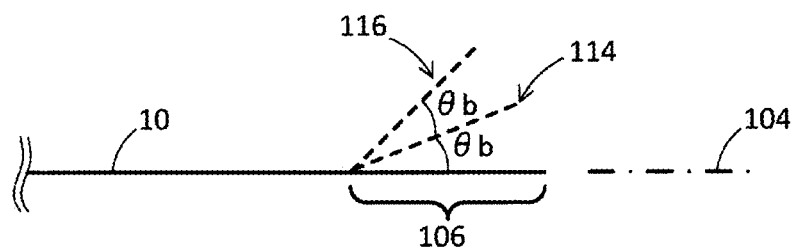
FIG. 38 is a schematic diagram illustrating a state where the flexible display is viewed from the lateral side.

Hereinafter, Modification 2 of the fifth exemplary embodiment will be described with reference to FIG. 38. FIG. 38 is a schematic diagram illustrating a state where the flexible display (the terminal device 10 itself in the example illustrated in FIG. 38) is seen from the lateral side. In Modification 2, the change amount is detected stepwise, and the controller 28 controls a process according to the detected change amount. Hereinafter, Modification 2 will be described in detail with reference to FIG. 38.

For example, when the flexible display is bent from the default reference position 104 to the position of a broken line portion 114 (a position of an angle θb), the specifying unit 30 specifies a function A associated with the bending amount (a bending amount corresponding to the angle θb), and the controller 28 notifies or executes a process using the function A. For example, when the flexible display is further bent from the position of the broken line portion 114 to a position of a broken line portion 116 (the position of the angle θb from the position of the broken line portion 114, that is, the position of the angle 2θb from the reference position 104) within a predetermined time limit from the time when the flexible display is bent to the position of the broken line portion 114, the specifying unit 30 specifies a function B associated with the bending amount (the bending amount corresponding to the angle 2θb), and the controller 28 notifies or executes a process using the function B. After the above-mentioned time limit elapses, the controller 28 uses the position of the broken line portion 114 as a reference position. In this case, when the flexible display is further bent from the position of the broken line portion 114 to the position of the broken line portion 116, the specifying unit 30 specifies the function A associated with the bending amount (the bending amount corresponding to the angle θb), and the controller 28 notifies or executes the process using the function A.

As another example, it is assumed that the flexible display is bent to the position of the broken line portion 114 (the position of the angle θb), and the bending amount (the bending amount corresponding to the angle θb) is detected by the detection unit 24. Next, it is assumed that the flexible display is further bent from the position of the broken line portion 114 to the position of the broken line portion 116 (a bending operation corresponding to the angle θb is further performed) within the predetermined time limit (time for establishing the deformation operation) from the time when the bending amount is detected, and the second bending operation is detected by the detection unit 24. In this case, the specifying unit 30 may specify a function C associated with the two-step bending operation, and the controller 28 may notify or execute a process using the specified function C. That is, when the flexible display is bent from the reference position 104 to the position of the broken line portion 114 (the angle θb), the bending amount (the bending amount corresponding to the angle θb) is detected by the detection unit 24, and the time limit elapses in that state, the deformation operation is established, and the controller 28 notifies or executes the process using the function A. Further, when the flexible display is bent from the reference position 104 to the position of the broken line portion 116 (the angle 2θb), and the bending amount (the bending amount corresponding to the angle 2θb) is detected by the detection unit 24 and when the time limit elapses in that state, the deformation operation is established, and the controller 28 notifies or executes the process using the function B. Further, when the flexible display is bent to the position of the broken line portion 114 (the position of the angle θb), the bending operation is detected by the detection unit 24, and the time limit elapses, the position of the broken line portion 114 is determined as the reference position. Then, when the flexible display is further bent from the position of the broken line portion 114 to the position of the broken line portion 116 (the bending operation corresponding to the angle θb is further performed), the bending amount (the bending amount corresponding to the angle θb) is detected by the detection unit 24, and the time limit elapses in that state, the deformation operation is established, and the controller 28 notifies or executes the process using the function A. Also, when the flexible display is bent to the position of the broken line portion 114 (the position of the angle θb), the bending operation is detected by the detection unit 24, then, the flexible display is further bent from the position of the broken line portion 114 to the position of the broken line portion 116 (the bending operation corresponding to the angle θb is further performed) within a time limit (before the deformation operation is established), the second bending operation is detected by the detection unit 24, and the time limit elapses in that state, the deformation operation is established, and the controller 28 notifies or executes the process using the function C.

According to Modification 2, the process according to the change amount detected stepwise is notified or executed, so that the number of executable processes may be increased even within the same range of the change amount.

Modification 3

Figure 39:
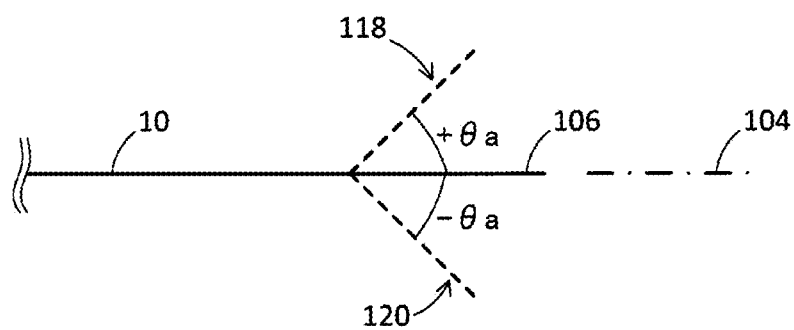
FIG. 39 is a schematic diagram illustrating a state where the flexible display is viewed from the lateral side.

Hereinafter, Modification 3 of the fifth exemplary embodiment will be described with reference to FIG. 39. FIG. 39 schematically illustrates a state where the flexible display (the terminal device 10 itself in the example illustrated in FIG. 39) is seen from the lateral side. In Modification 3, the controller 28 controls a process according to a change direction of the flexible display.

The change amount, the change direction, and the function are associated with each other. The specifying unit 30 specifies a function associated with the change amount and the change direction which are detected by the detection unit 24, and the controller 28 notifies or executes a process using the specified function.

For example, when the portion 106 of the flexible display is bent from the reference position 104 to a position of a broken line portion 118 as illustrated in FIG. 39, the detection unit 24 detects the bending amount and the bending direction. In the example illustrated in FIG. 39, an angle +θa is detected as the bending amount and the bending direction. The specifying unit 30 specifies a function associated with the angle +θa, and the controller 28 notifies or executes a process using the specified function.

Further, when the portion 106 of the flexible display is bent from the reference position 104 to a position of a broken line portion 120, the detection unit 24 detects its bending amount and its bending direction. The position of the broken line portion 120 is a position opposite to the broken line portion 118 across the reference position 104, and an angle −θa is detected as the bending amount and the bending direction. The specifying unit 30 specifies a function associated with the angle −θa, and the controller 28 notifies or executes a process using the specified function. The angle −θa is associated with a function different from the function associated with the angle +θa. Thus, when the flexible display is bent to the position of the angle −θa, a process using the function different from the case where the flexible display is bent to the position of the angle +θa, is notified or executed.

According to Modification 3, since the process according to the change amount and the change direction is controlled, more processes may be controlled, as compared with the case where the process according to the change amount only or the change direction only is controlled.

Each of the terminal device 10, the devices 12 and 14, and the server 16 is implemented by, for example, cooperation of hardware and software. Specifically, each of the terminal device 10, the devices 12 and 14, and the server 16 includes one or plural processors such as CPUs (not illustrated). As the one or plural processors read and execute a program stored in the storage device (not illustrated), the functions of each part of the terminal device 10, the devices 12 and 14, and the server 16 are implemented. The program is stored in a storage device via a recording medium such as a CD or a DVD, or via a communication path such as a network. As another example, each part of the terminal device 10, the devices 12 and 14, and the server 16 may be implemented by hardware resources such as a processor, an electronic circuit, an application specific integrated circuit (ASIC), or the like. A device such as a memory may be used in the implementation. As still another example, each unit of the terminal device 10, the devices 12 and 14, and the server 16 may be implemented by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a controller that controls an instruction to a control target associated with an image displayed at a changed position, according to a detection result of a change in each position on a deformable display, wherein
the change of the display is a bending change of the display, and
the controller controls notification of a function executable using a control target associated with an image displayed on an extension line of a bending direction.

2. The information processing device according to claim 1, wherein the controller further changes the image displayed at the changed position, according to the detection result.

3. The information processing device according to claim 2, wherein when the control target associated with the image displayed at the changed position is not controllable, the controller returns the image after the change to an original image and displays the original image.

4. The information processing device according to claim 1, wherein the controller controls notification of a function executable using the control target associated with the image displayed at the changed position.

5. The information processing device according to claim 4, wherein when a specific change of the display is detected, the controller controls notification of a linkage function executable using a plurality of the control targets associated with the image displayed at the changed position.

6. The information processing device according to claim 5, wherein when a plurality of the images associated with the plurality of control targets are displayed at a position corresponding to the specific change, the controller controls notification of the linkage function executable using the plurality of control targets.

7. The information processing device according to claim 5, wherein the controller changes the linkage function according to a mode of change of the display.

8. The information processing device according to claim 7, wherein
the change of the display is a bending change of the display, and
the controller changes the linkage function according to a mode of the bending change.

9. The information processing device according to claim 1, wherein when one image associated with one control target is displayed on the extension line, the controller controls notification of a solo function executable using the one control target.

10. The information processing device according to claim 1, wherein when a plurality of images associated with a plurality of control targets are displayed on the extension line, the controller controls notification of a linkage function executable using the plurality of control targets.

11. The information processing device according to claim 10, wherein the controller changes the linkage function according to an arrangement order of the plurality of images on the extension line.

12. The information processing device according to claim 1, wherein the controller controls notification of a function executable using a portion of the control target associated with the image displayed on the extension line.

13. The information processing device according to claim 1, wherein
the display includes
a first screen that displays a state of the control target viewed from a first direction, and
a second screen that displays a state of the control target viewed from a second direction, and the controller performs a control according to the respective changes in the first screen and the change in the second screen.

14. The information processing device according to claim 13, wherein
when a valid change with respect to the first screen is detected, the controller controls an instruction to a function associated with the first direction side of the control target, and
when a valid change with respect to the second screen is detected, the controller controls an instruction to a function associated with the second direction side of the control target.

15. The information processing device according to claim 14, wherein
a bending operation of the display toward the first screen side is detected as a valid change with respect to the first screen, and
a bending operation of the display toward the second screen is detected as a valid operation with respect to the second screen.

16. The information processing device according to claim 1, wherein the control target is at least one of a device, a function, a file, or software.

17. The information processing device according to claim 1, further comprising:
the display.

18. An information processing method comprising:
controlling an instruction to a control target associated with an image displayed at a changed position, according to a detection result of a change in each position on a deformable display, wherein the change of the display is a bending change of the display; and
controlling notification of a function executable using a control target associated with an image displayed on an extension line of a bending direction.

19. A non-transitory computer readable medium storing a program causing a computer to execute information processing, the information processing comprising:
controlling an instruction to a control target associated with an image displayed at a changed position, according to a detection result of a change in each position on a deformable display, wherein the change of the display is a bending change of the display; and
controlling notification of a function executable using a control target associated with an image displayed on an extension line of a bending direction.

* * * * *